(12) United States Patent
McDannel et al.

(10) Patent No.: US 11,182,852 B1
(45) Date of Patent: Nov. 23, 2021

(54) EXCHANGE COMPUTING SYSTEM INCLUDING A REFERENCE RATE GENERATION UNIT

(71) Applicant: Chicago Mercantile Exchange Inc., Chicago, IL (US)

(72) Inventors: Graham Robert McDannel, Chicago, IL (US); Makenzie June Billings Quinn, Bartlett, IL (US); Liam Gerard Smith, Chicago, IL (US); Robert Jason Timberlake, Chicago, IL (US); Anna-Lisa Suarez Vu, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 541 days.

(21) Appl. No.: 15/891,123

(22) Filed: Feb. 7, 2018

Related U.S. Application Data

(63) Continuation-in-part of application No. 15/849,161, filed on Dec. 20, 2017, now abandoned.

(51) Int. Cl.
*G06Q 40/02* (2012.01)
*G06Q 40/04* (2012.01)
*H02J 7/00* (2006.01)
*G06Q 50/06* (2012.01)

(52) U.S. Cl.
CPC .......... *G06Q 40/025* (2013.01); *G06Q 40/04* (2013.01); *G06Q 50/06* (2013.01); *H02J 7/007* (2013.01); *H02J 7/0013* (2013.01)

(58) Field of Classification Search
CPC ...... G06Q 40/025; G06Q 40/04; G06Q 50/06; G06Q 40/00; G06Q 40/06; G06Q 30/0601; G06Q 40/02; G06Q 20/10; G06Q 40/08; G06Q 10/00; G06Q 10/063; G06Q 30/0633; G06Q 30/08; G06Q 40/10; G06Q 50/34; G06Q 90/00; G06Q 99/00; H02J 7/0013;
(Continued)

(56) References Cited

U.S. PATENT DOCUMENTS

| 4,700,297 | A | * | 10/1987 | Hagel, Sr. | ............. | G06Q 20/40 |
| | | | | | | 705/30 |
| 6,304,858 | B1 | | 10/2001 | Mosler et al. | | |
| 7,177,834 | B1 | | 2/2007 | Maestle | | |

(Continued)

FOREIGN PATENT DOCUMENTS

WO  201475004 A1  5/2014

OTHER PUBLICATIONS

"Could a Repo Rate Benchmark Replace LIBOR or EURIBOR?" https://www.icmagroup.org/Regulatory-Policy-and-Market-Practice/repo-and-collateral-markets/frequently-asked-questions-on-repo/38-could-a-repo-rate-benchmark-replace-libor-or-euribor/. International Capital Market Association.

(Continued)

*Primary Examiner* — Namrata Boveja
*Assistant Examiner* — Slade E Smith
(74) *Attorney, Agent, or Firm* — Lempia Summerfield Katz LLC

(57) ABSTRACT

A physical container (e.g., a battery) may be filled up (charged) or emptied (discharged) with energy commensurate with a reference rate, or a change in a segment reference rate. The disclosure also provides computing systems and methods for generating dynamic, customizable interest rate benchmarks based on previously executed transactions and a fixed parameter in a request.

13 Claims, 6 Drawing Sheets

(58) Field of Classification Search
CPC ...... H02J 7/007; H04L 51/18; G07F 17/3288;
G07F 7/10
USPC .......................................................... 705/37
See application file for complete search history.

(56) References Cited

U.S. PATENT DOCUMENTS

| | | | |
|---|---|---|---|
| 7,831,491 B2 | 11/2010 | Newell et al. | |
| 7,853,499 B2 | 12/2010 | Czupek et al. | |
| 7,860,767 B1* | 12/2010 | Vinci | G06Q 40/00 705/35 |
| 10,198,766 B1* | 2/2019 | Dharmadhikari | G06F 17/00 |
| 2003/0069820 A1* | 4/2003 | Hillmer | G06Q 20/4037 705/35 |
| 2003/0182230 A1* | 9/2003 | Pessin | G06Q 40/025 705/39 |
| 2004/0236546 A1* | 11/2004 | Goldberg | G06Q 40/06 703/2 |
| 2005/0096999 A1* | 5/2005 | Newell | G06Q 20/10 705/26.1 |
| 2005/0177485 A1* | 8/2005 | Peter | G06Q 40/04 705/35 |
| 2006/0247987 A1* | 11/2006 | Busch | G06Q 40/12 705/30 |
| 2007/0000999 A1* | 1/2007 | Kubo | G06Q 40/00 235/380 |
| 2007/0192226 A1* | 8/2007 | Uhlmann | G06Q 40/04 705/36 R |
| 2008/0052207 A1* | 2/2008 | Paglin | G06Q 40/00 705/35 |
| 2008/0177673 A1* | 7/2008 | Ahn | G06Q 40/06 705/36 R |
| 2008/0249956 A1* | 10/2008 | Connors | G06Q 40/00 705/36 R |
| 2008/0249958 A1* | 10/2008 | Anguish | G06Q 40/04 705/36 R |
| 2009/0222385 A1* | 9/2009 | Chen | G06Q 40/06 705/36 T |
| 2010/0106633 A1* | 4/2010 | Iyer | G06Q 40/00 705/35 |
| 2010/0145841 A1* | 6/2010 | Iyer | G06Q 40/00 705/37 |
| 2010/0287118 A1* | 11/2010 | Lortscher, Jr. | G06Q 40/06 705/36 R |
| 2011/0258103 A1* | 10/2011 | Oaten | G06Q 40/00 705/37 |
| 2012/0022995 A1* | 1/2012 | Lange | G06Q 40/08 705/37 |
| 2012/0023040 A1* | 1/2012 | Benoit | G06Q 40/10 705/36 T |
| 2012/0047058 A1* | 2/2012 | Wilson, Jr. | G06Q 99/00 705/37 |
| 2012/0078813 A1* | 3/2012 | Rose | G06Q 40/00 705/36 R |
| 2012/0150766 A1* | 6/2012 | Payne | G06Q 40/06 705/36 R |
| 2012/0296792 A1* | 11/2012 | Levoff | G06Q 40/04 705/37 |
| 2012/0296793 A1* | 11/2012 | Wilson, Jr. | G06Q 40/04 705/37 |
| 2012/0296798 A1* | 11/2012 | Riddle, Jr. | G06Q 40/04 705/37 |
| 2012/0303511 A1* | 11/2012 | Sandor | G11C 13/0007 705/37 |
| 2013/0014010 A1* | 1/2013 | Ziegler | G06Q 40/04 715/703 |
| 2013/0041843 A1* | 2/2013 | Nyhoff | G06Q 40/06 705/36 R |
| 2013/0325674 A1* | 12/2013 | Yeri | G06Q 40/02 705/30 |
| 2013/0325713 A1* | 12/2013 | Yeri | G06Q 30/02 705/42 |
| 2013/0325716 A1* | 12/2013 | Yeri | G06Q 40/02 705/43 |
| 2014/0006243 A1* | 1/2014 | Boudreault | G06Q 40/04 705/37 |
| 2014/0114826 A1* | 4/2014 | Lopez | G06Q 30/04 705/34 |
| 2014/0149272 A1* | 5/2014 | Hirani | G06Q 90/00 705/37 |
| 2014/0156509 A1* | 6/2014 | Hendrix | G06Q 40/02 705/39 |
| 2014/0180897 A1* | 6/2014 | Dale | G06Q 40/04 705/37 |
| 2014/0279368 A1* | 9/2014 | Chan | G06Q 40/04 705/37 |
| 2015/0213381 A1* | 7/2015 | Hagiwara | G06Q 10/063 705/7.29 |
| 2015/0262305 A1* | 9/2015 | Bawadhankar | G06Q 40/06 705/36 R |
| 2015/0269673 A1* | 9/2015 | Wilson | G06Q 40/04 705/37 |
| 2015/0310548 A1* | 10/2015 | Hoffman | G06Q 40/04 705/37 |
| 2016/0140657 A1* | 5/2016 | Xythalis | G06Q 40/04 705/37 |
| 2016/0321666 A1* | 11/2016 | Dragushan | G06Q 20/342 |
| 2017/0364915 A1* | 12/2017 | Levy | H04L 67/42 |
| 2017/0365001 A1* | 12/2017 | Sandor | G06Q 40/04 |
| 2018/0025767 A1* | 1/2018 | Sandor | H04W 4/60 365/148 |
| 2018/0108087 A1* | 4/2018 | Sandor | G06Q 40/04 |

OTHER PUBLICATIONS

Alex Harris, "Sneak Preview in the Works for Timing of U.S. Libor Alternative," https://www.bloomberg.com/news/articles/2017-07-31/sneak-preview-in-the-works-for-timing-of-u-s-libor-alternative, Jul. 31, 2017.

BBR Staff Writer, "Libor may be Replaced by a New System in 2014," http://retailbanking.banking-business-review.com/news/libor-may-be-replaced-by-a-new-system-in-2014-130513, May 13, 2013.

BBR Staff Writer, "London Likely to Retain Libor Control," http://riskmanagement.banking-business-review.com/news/london-likely-to-retain-libor-conttrol-130913, Sep. 13, 2013.

Ben Protess, "Gensler Calls for Overhaul of Libor," https://dealbook.nytimes.com/2012/09/24/gensler-calls-for-overhaul-of-libor/, Sep. 24, 2012.

Brad Finkelstein, "Libor Going Away Creates a Compliance Trap for ARM Lenders; Picking a new benchmark for adjustable-rate mortgages is the easy part. Industrywide implementation is where things get tricky," https://dialog.proquest.com/professional/docview/1941648925?accountid=157282, Gale PROMT, Sep. 22, 2017.

Chad Bray, "Libor Brought Scandal, Cost Billions—and may be going away," https://www.nytimes.com/2017/07/27/dusiness/dealbook/libor-fca-banks-andrew-bailey.html, Jul. 27, 2017.

Daniel Kurt, "Will OIS Replace LIBOR?" http://www.investopedia.com/articles/forex/053014/will-ois-replace-libor.asp.

Darrell Duffie et al., "Reforming LIBOR and Other Financial Market Benchmarks," Journal of Economic Perspectives, Spring 2015, vol. 29, No. 2, pp. 191-212.

David Blaitt, "The Death of LIBOR Will Have Minimal Impact on U.S. Real Estate Loans According to CapStack Partners' CEO, David Blatt," http://www.prnewswire.com/news-releases/the-death-of-libor-will-have-minimal-impact-on-us-real-estate-loans-according-to-capstack-partners-ceo-david-blatt-300505354.html, Aug. 16, 2017.

David Enrich, "Libor: A Eulogy for the World's Most Important Number—Update," http://www.foxbusiness.com/features/2017/07/27/libor-eulogy-for-worlds-most-important-number-update.html, Jul. 27, 2017, Dow Jones Newswires.

David H. Jones et al., "LIBOR is Dying; Many May Mourn," https://dialog.proquest.com/professional/docview/1943473233?accountid= 157282, Mondaq Business Briefing, Sep. 26, 2017.

David Hou et al., "LIBOR: Origins, Economics, Crisis, Scandal, and Reform," Federal Reserve Bank of New York Staff Reports, No. 667, Mar. 2014.

(56) References Cited

OTHER PUBLICATIONS

Floyd Norris, "After Fraud, the Fog Around Libor Hasn't Lifted," http://www.nytimes.eom/2013/11/01/business/after-fraud-the-fog-around-libor-hasnt-cleared.html, Oct. 31, 2013.
Floyd Norris, "Finding a Rate That's Fairer than Libor," http://www.nytimes.com/2013/04/05/business/steering-a-better-course-past-the-fiction-of-libor.html, Apr. 4, 2013.
Floyd Norris, "The Myth of Fixing the Libor," http://www.nytimes.com/2012/09/28/business/the-myth-of-fixing-the-libor-high-low-finance.html, Sep. 27, 2012.
General Incorporated Association JBA Tibor Administration, "Revision to the 'JBA TIBOR Code of Conduct' Reflecting the Result of the 3rd Public Consultation, and Implementation Date of JBA TIBOR Reform, ect.," http://www.jbatibor.or.ip/english/news/Revision_of_CoC.html.
Harry Wilson, "Libor Reform 'Will Make Rigging of Markets More Profitable,'" https://www.thetimes.co.uk/article/libor-reform-will-make-rigging-more-profitable-experts-warn-sxd66x75n, Aug. 14, 2017, The Times.
Huw Jones, "Bank of England Wants Less Libor-centric Financial World," Reuters, Business News, Jul. 17, 2017.
Katie Martin, "BoE Committee Picks Sonia as New Sterling Benchmark in Post-Libor Reform," https://www.ft.com/content/8babde42-c354-3e3d-a59a-304023be640d, Apr. 28, 2017.
Katy Burne, "Banks Vote on New U.S. Reference Rate to Replace Libor," http://www.foxbusiness.com/features/2017/06/22/banks-vote-on-new-u-s-reference-rate-to-replace-libor.html, Jun. 22, 2017.
Liz McCormick et al., "Death Knell of Libor Heeralds Structured Notes Backed by . . . Libor," https://www.bloomberg.com/news/articles/2017-08-22/death-knell-of-libor-heralds-structured-notes-backed-by-libor, Aug. 21, 2017.
Lukas Becker, "Libor Reform: The Sound of Silence," http://www.risk.net/derivatives/2449632/libor-reform-sound-silence.
M. Shahe Emran, "Is Black Market Exchange Rate a Good Indicator of Equilibrium Exchange Rate? A Simple Test With Evidence From South Asia," George Washington University, Dept. of Economics and ESIA.
Marcel Fratzscher et al., "The Scapegoat Theory of Exchange Rates: The First Tests," European Central Bank and CEPR, Dec. 2010.
Mark Gilbert, "Monkeying With Libor: It Would be Simpler to Refurbish the Benchmark than Kill it," https://www.bloomberg.com/news/articles/2017-08-17/mending-broken-libor-rates-j6g41bz8, Aug. 17, 2017.
Mark Scott, "Britain Begins Review of Libor," https://dealbook.nytimes.com/2012/07/30/britain-launches-review-of-libor, Jul. 30, 2012.
Mark Scott, "European Regulators Propose Overhaul of Benchmark Interest Rate," https://dealbook.nytimes.com/2013/01/11/regulators-propose-overhaul-of-eurobor-interest-rate/, Jan. 11, 2013.
Mayer Brown, "Questions Arise About the Fed's Proposed Replacement for LIBOR," https://www.mayerbrown.com/questions-arise-about-the-feds-proposed-replacement-for-libor-05-02-2017/, May 2, 2017.
Mitul Patel, "Bidding a Farewell to LIBOR," https://seekingalpha.com/article/4092410-bidding-farewell-libor, Jul. 30, 2017, Janus Henderson Investors.
Muhammad Omer et al., "Testing Uncovered Interest Rate Parity Using LIBOR," http://hdl.handle.net/10419/61033, CESifo Working Paper: Monetary Policy and International Finance, No. 3839, Jun. 2012.
Nikkei, "Revised Tibor Rates to Better Reflect Market Forces," https://asia.nikkei.com/Markets/Capital-Markets/Revised-Tibor-rates-to-better-reflect-market-forces, Jul. 7, 2017.
Paige Long, "Back to Drawing Board for Euribor Reform, Officials Say," https://www.law360.com/articles/920936/back-to-drawing-board-for-euribor-reform-officials-say. May 5, 2017.
Rebecca Tabb et al., "Alternatives to Libor," Capital Markets Law Journal,, Jun. 30, 2013, 30 pp.
Reuters, "Big Monetary Stimulus on Tap at G20," https://www.iol.co.za/business-report/international/big-monetary-stimulus-on-tap-at-g20-1503447, Apr. 19, 2013.
Reuters, "Factbox: Why do Regulators Want a Libor Alternative?" https://www.reuters.com/article/us-banks-libor-derivatives-factbox/factbox-why-do-regulators-want-a-libor-alternative-idUSKBN19B27V, Jun. 20, 2017, Reuters Business News.
Rosa M. Abrantes-Meiz, "Why and How Should the Libor be Reformed?", Jun. 26, 2012, 5 pp.
Ross Lancaster, "US Derivatives Market Prepares for Repo Rate to Replace Libor," https://dialog.proquest.com/professional/docview/1922344341?accountid=157282, Euromoney Institutional Investor PLC, Jul. 24, 2017.
Suzi Ring, "Libor to End in 2021 as FCA Says Bank Benchmark Is Untenable (2)," https://www.washingtonpost.com/business/2017/07/27/acdd411c-72bc-11e7-8c17-533c52b2f014_story.html?utm_term=.b21e7cf8f193, Jul. 27, 2017.
Tim Wallace, "Libor's US Owners to Fight UK Plan to Scrap the Interest Benchmark," http://www.telegraph.co.uk/business/2017/07/29/libors-us-owners-fight-uk-plan-scrap-interest-benchmark/, Jul. 29, 2017.
Tim Worstall, "To Explain the Difficulty with Replacing Libor—It's Impossible Actually," https://www.forbes.com/sites/timworstall/2017/07/28/to-explain-the-difficulty-with-replacing-libor-its-impossible-actually/#76dae6c258ae, Jul. 28, 2017.
Tony Miscimarra, "Replacing LIBOR A Surprising Lesson from the Fixed Income Industry," BondWave LLC, Wheaton, IL, Sep. 2017.
Tortoise, "Replacing LIBOR: The Countdown Begins," https://www.forbes.com/sites/tortoiseinvest/2017/08/16/replacing-libor-the-countdown-begins/#47867d964e2b, Aug. 16, 2017.
Wendy H. Baesler, "Do Two Libor Reforms Reduce the Effect of Incentives on Submitted Rates?" 2016 Dissertation, University of Washington.
William J. Crowder, "Testing Stationarity of Real Exchange Rates using Johansen Tests," University of Texas at Arlington, Dept. of Economics.

* cited by examiner

EXCHANGE COMPUTING SYSTEM INCLUDING A REFERENCE RATE GENERATION UNIT

CROSS-REFERENCE TO RELATED APPLICATIONS

This application is a continuation-in-part of U.S. patent application Ser. No. 15/849,161 filed Dec. 20, 2017, the entire disclosure of which is hereby incorporated by reference.

FIELD OF INVENTION

Embodiments of the present disclosure relate to systems and methods for filling up or draining a physical container (e.g., a battery) with energy commensurate with a rate generation unit. More particularly, the disclosure provides computing systems for generating dynamic, customizable interest rate benchmarks.

BACKGROUND

LIBOR, which stands for the London interbank offered rate, is a benchmark rate that some of the world's leading banks charge each other for short-term loans. LIBOR is designed to provide banks around the world with an accurate picture of how much it costs to borrow short term. Each day, several, e.g., approximately twenty, of the world's leading banks are surveyed to determine what it would cost the banks to borrow funds from other lenders on the London interbank market. LIBOR is the average of these survey responses. Each business day, LIBOR rates are calculated for five currencies (U.S. dollar (USD), Euro (EUR), pound sterling (GBP), Japanese yen (JPY) and Swiss franc (CHF)) and seven borrowing periods (overnight, one week, and 1, 2, 3, 6 and 12 months). Thus, there are a total of 35 different LIBOR rates each business day, with the 3-month U.S. dollar rate being the most common one (usually referred to as the "current LIBOR rate"). LIBOR serves as a benchmark reference rate for many of the world's financial products, including adjustable rate mortgages, business loans, and financial instruments traded on global financial markets. Many economists have referred to LIBOR as the most important number in the finance world.

However, LIBOR suffers from several shortcomings. LIBOR is intended to represent the costs that each bank would face if it received an unsecured deposit from another bank, but the number of such transactions between banks is very small. Thus, the banks' estimations of LIBOR rates is not based on empirical data or actual transactions. Moreover, because LIBOR is based on surveying a small number of banks, and the banks answers to the surveys are not heavily regulated or governed, leaving the survey responses open to manipulation.

As such, many of the world's leading financial institutions have called for phasing out the use of LIBOR over the next few years. The Federal Reserve has tasked the Alternative Reference Rate Committee (ARRC) with transitioning from U.S. Dollar LIBOR to a new benchmark replacement rate. The ARRC has recommended using the Broad Treasury Financing Rate (BTFR) as the U.S. benchmark to replace LIBOR. The BTFR rate contains a broad set of US treasury market based financing transactions, also known as repo transactions. The Federal Reserve intends to begin publishing the BTFR index rates in the first half of 2018. This BTFR rate is expected to run in parallel with LIBOR for several years in order to help determine a fair compensating credit spread between LIBOR and BTFR for those financial assets that will need to change their reference interest rate to the new index.

The Bank of England has recommended replacing LIBOR with the Sterling Over Night Index Average, or Sonia. Sonia reflects unsecured short-term transactions tied to the pound. Many in Europe already consider Eonia, the Euro Overnight Index Average, to be a viable alternative rate to Euribor. Japan identified the uncollateralized overnight call rate, known as Tonar, calculated and published by the Bank of Japan as the JPY risk-free rate. Some economists have proposed using the overnight indexed swap (OIS) rate. OIS is typically tied to a given country's central bank rate, i.e. the Fed funds rate in the U.S., so it is less prone to manipulation.

Although many possibilities exist for generating reference rates, there is a need for improved computing systems and methods for generating transaction based, dynamic and customizable interest rate benchmarks.

DETAILED DESCRIPTION

In the following description of various embodiments, reference is made to the accompanying drawings, which form a part hereof, and in which various embodiments are shown by way of illustration. It is to be understood that there are other embodiments and that structural and functional modifications may be made. Embodiments of the present invention may take physical form in certain parts and steps, examples of which will be described in detail in the following description and illustrated in the accompanying drawings that form a part hereof.

Figure 1:
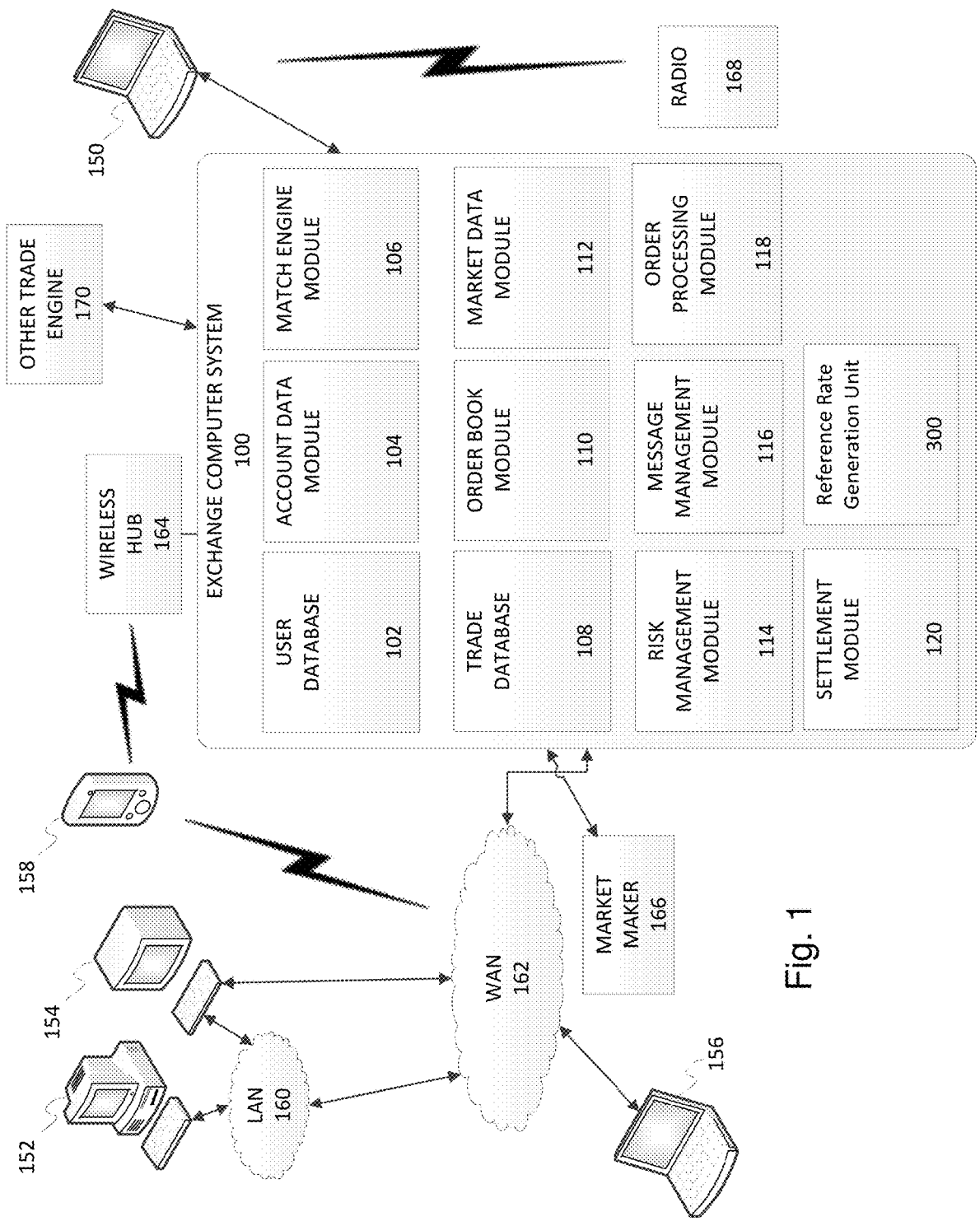
FIG. 1 depicts a computer network system, according to some embodiments.

Aspects of the present disclosure may be implemented with specially programmed computer devices and/or specially programmed computer systems that allow users to exchange trading information. An illustrative computing system specially programmed to implement a trading network environment defining illustrative trading systems and methods is shown in FIG. 1.

The disclosed embodiments relate generally to a rate generation method and system that receives a plurality of transactions and generates different rates that can be used for different upcoming transactions that use or rely upon a reference rate. An exchange computing system may generate rates in response to a request. Or, the exchange computing system may publish a plurality of transaction based reference rates for various market or industry segments, or segment reference rates.

In at least some embodiments, systems and methods for filling up or draining a physical container (e.g., a battery) with energy commensurate with a reference rate, or a segment reference rate, are disclosed. More particularly, the disclosure provides computing systems for determining reference rates for interest rate based transactions related to particular products, e.g., energy products, where the reference rate is related to, or more accurately represents, the transaction in which the reference rate is implemented. Some embodiments include computer-readable media storing instructions that, when executed, cause a computer system to perform such methods. The energy products may be based on energy sources (e.g., commodities) such as crude oil, coal, natural gas, heating oil, gasoline, ICE Brent Crude, ICE Gasoil, ICE low sulfur, Crude Gulf Sour, and the like.

Exchange Computing System

One exemplary environment where an improved reference rate generation unit may be useful is in financial markets, and in particular, electronic financial exchanges, such as a futures exchange, such as the Chicago Mercantile Exchange Inc. (CME). For example, as described in further detail below, an exchange computing system may offer financial instruments, e.g., futures contracts, based on a request specific reference rate. The exchange computing system may also generate and publish segment reference rates for a plurality of preselected industry or market segments.

A financial instrument trading system, such as a futures exchange, such as the Chicago Mercantile Exchange Inc. (CME), provides a contract market where financial instruments, e.g., futures and options on futures, are traded using electronic systems. "Futures" is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option contract is the right, but not the obligation, to sell or buy the underlying instrument (in this case, a futures contract) at a specified price on or before a certain expiration date. An option contract offers an opportunity to take advantage of futures price moves without actually having a futures position. The commodity to be delivered in fulfillment of the contract, or alternatively the commodity for which the cash market price shall determine the final settlement price of the futures contract, is known as the contract's underlying reference or "underlier." The underlying or underlier for an options contract is the corresponding futures contract that is purchased or sold upon the exercise of the option.

The terms and conditions of each futures contract are standardized as to the specification of the contract's underlying reference commodity, the quality of such commodity, quantity, delivery date, and means of contract settlement. Cash settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price. Options and futures may be based on more generalized market indicators, such as stock indices, interest rates, futures contracts and other derivatives.

Electronic Trading

Electronic trading of financial instruments, such as futures contracts, is conducted by market participants sending orders, such as to buy or sell one or more futures contracts, in electronic form to the exchange. These electronically submitted orders to buy and sell are then matched, if possible, by the exchange, i.e., by the exchange's matching engine, to execute a trade. Outstanding (unmatched, wholly unsatisfied/unfilled or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book is typically maintained for each product, e.g., instrument, traded on the electronic trading system and generally defines or otherwise represents the state of the market for that product, i.e., the current prices at which the market participants are willing buy or sell that product. As such, as used herein, an order book for a product may also be referred to as a market for that product.

Upon receipt of an incoming order to trade in a particular financial instrument, whether for a single-component financial instrument, e.g., a single futures contract, or for a multiple-component financial instrument, e.g., a combination contract such as a spread contract, a match engine, as described herein, will attempt to identify a previously received but unsatisfied order counter thereto, i.e., for the opposite transaction (buy or sell) in the same financial instrument at the same or better price (but not necessarily for the same quantity unless, for example, either order specifies a condition that it must be entirely filled or not at all).

Previously received but unsatisfied orders, i.e., orders which either did not match with a counter order when they were received or their quantity was only partially satisfied, referred to as a partial fill, are maintained by the electronic trading system in an order book database/data structure to await the subsequent arrival of matching orders or the occurrence of other conditions which may cause the order to be modified or otherwise removed from the order book.

If the match engine identifies one or more suitable previously received but unsatisfied counter orders, they, and the incoming order, are matched to execute a trade there between to at least partially satisfy the quantities of one or both the incoming order or the identified orders. If there remains any residual unsatisfied quantity of the identified one or more orders, those orders are left on the order book with their remaining quantity to await a subsequent suitable counter order, i.e., to rest. If the match engine does not identify a suitable previously received but unsatisfied counter order, or the one or more identified suitable previously received but unsatisfied counter orders are for a lesser quantity than the incoming order, the incoming order is placed on the order book, referred to as "resting", with original or remaining unsatisfied quantity, to await a subsequently received suitable order counter thereto. The match engine then generates match event data reflecting the result of this matching process. Other components of the electronic trading system, as will be described, then generate the respective order acknowledgment and market data messages and transmit those messages to the market participants.

Matching, which is a function typically performed by the exchange, is a process, for a given order which specifies a desire to buy or sell a quantity of a particular instrument at a particular price, of seeking/identifying one or more wholly or partially, with respect to quantity, satisfying counter orders thereto, e.g., a sell counter to an order to buy, or vice versa, for the same instrument at the same, or sometimes better, price (but not necessarily the same quantity), which are then paired for execution to complete a trade between the respective market participants (via the exchange) and at least partially satisfy the desired quantity of one or both of the order and/or the counter order, with any residual unsatisfied quantity left to await another suitable counter order, referred to as "resting." A match event may occur, for example, when an aggressing order matches with a resting order. In one embodiment, two orders match because one order includes instructions for or specifies buying a quantity of a particular instrument at a particular price, and the other order includes instructions for or specifies selling a (different or same) quantity of the instrument at a same or better price. It should be appreciated that performing an instruction associated with a message may include attempting to perform the instruction. Whether or not an exchange computing system is able to successfully perform an instruction may depend on the state of the electronic marketplace.

While the disclosed embodiments will be described with respect to a product by product or market by market implementation, e.g. implemented for each market/order book, it will be appreciated that the disclosed embodiments may be implemented so as to apply across markets for multiple products traded on one or more electronic trading systems, such as by monitoring an aggregate, correlated or other derivation of the relevant indicative parameters as described herein.

While the disclosed embodiments may be discussed in relation to futures and/or options on futures trading, it should be appreciated that the disclosed embodiments may be applicable to any equity, fixed income security, currency, commodity, options or futures trading system or market now available or later developed. It may be appreciated that a trading environment, such as a futures exchange as described herein, implements one or more economic markets where rights and obligations may be traded. As such, a trading environment may be characterized by a need to maintain market integrity, transparency, predictability, fair/equitable access and participant expectations with respect thereto. In addition, it may be appreciated that electronic trading systems further impose additional expectations and demands by market participants as to transaction processing speed, latency, capacity and response time, while creating additional complexities relating thereto. Accordingly, as will be described, the disclosed embodiments may further include functionality to ensure that the expectations of market participants are met, e.g., that transactional integrity and predictable system responses are maintained.

Financial instrument trading systems allow traders to submit orders and receive confirmations, market data, and other information electronically via electronic messages exchanged using a network. Electronic trading systems ideally attempt to offer a more efficient, fair and balanced market where market prices reflect a true consensus of the value of traded products among the market participants, where the intentional or unintentional influence of any one market participant is minimized if not eliminated, and where unfair or inequitable advantages with respect to information access are minimized if not eliminated.

Electronic marketplaces attempt to achieve these goals by using electronic messages to communicate actions and related data of the electronic marketplace between market participants, clearing firms, clearing houses, and other parties. The messages can be received using an electronic trading system, wherein an action or transaction associated with the messages may be executed. For example, the message may contain information relating to an order to buy or sell a product in a particular electronic marketplace, and the action associated with the message may indicate that the order is to be placed in the electronic marketplace such that other orders which were previously placed may potentially be matched to the order of the received message. Thus the electronic marketplace may conduct market activities through electronic systems.

An exchange may provide for a centralized "clearing house" through which trades made must be confirmed, matched, and settled each day until offset or delivered. The clearing house may be an adjunct to an exchange, and may be an operating division of an exchange, which is responsible for settling trading accounts, clearing trades, collecting and maintaining performance bond funds, regulating delivery, and reporting trading data. One of the roles of the clearing house is to mitigate credit risk. Clearing is the procedure through which the clearing house becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the clearing house.

An exchange computing system may operate under a central counterparty model, where the exchange acts as an intermediary between market participants for the transaction of financial instruments. In particular, the exchange computing system novates itself into the transactions between the market participants, i.e., splits a given transaction between the parties into two separate transactions where the exchange computing system substitutes itself as the counterparty to each of the parties for that part of the transaction, sometimes referred to as a novation. In this way, the exchange computing system acts as a guarantor and central counterparty and there is no need for the market participants to disclose their identities to each other, or subject themselves to credit or other investigations by a potential counterparty. For example, the exchange computing system insulates one market participant from the default by another market participant. Market participants need only meet the requirements of the exchange computing system. Anonymity among the market participants encourages a more liquid market environment as there are lower barriers to participation. The exchange computing system can accordingly offer benefits such as centralized and anonymous matching and clearing.

Electronic Data Transaction Request Messages

As used herein, a financial message, or an electronic message, refers both to messages communicated by market participants to an electronic trading or market system and vice versa. The messages may be communicated using packeting or other techniques operable to communicate information between systems and system components. Some messages may be associated with actions to be taken in the electronic trading or market system. In particular, in one embodiment, upon receipt of a request, a token is allocated and included in a TCP shallow acknowledgment transmission sent back to the participant acknowledging receipt of the request. It should be appreciated that while this shallow acknowledgment is, in some sense, a response to the request, it does not confirm the processing of an order included in the request. The participant, i.e., their device, then sends back a TCP acknowledgment which acknowledges receipt of the shallow acknowledgment and token.

Financial messages communicated to the electronic trading system, also referred to as "inbound" messages, may include associated actions that characterize the messages, such as trader orders, order modifications, order cancellations and the like, as well as other message types. Inbound messages may be sent from client devices associated with market participants, or their representatives, e.g., trade order messages, etc., to an electronic trading or market system. For example, a market participant may submit an electronic message to the electronic trading system that includes an associated specific action to be undertaken by the electronic trading system, such as entering a new trade order into the market or modifying an existing order in the market. In one embodiment, if a participant wishes to modify a previously sent request, e.g., a prior order which has not yet been processed or traded, they may send a request message comprising a request to modify the prior request. In one exemplary embodiment, the incoming request itself, e.g., the inbound order entry, may be referred to as an iLink message. iLink is a bidirectional communications/message protocol/message format implemented by the Chicago Mercantile Exchange Inc.

Financial messages communicated from the electronic trading system, referred to as "outbound" messages, may include messages responsive to inbound messages, such as confirmation messages, or other messages such as market update messages, quote messages, and the like. Outbound messages may be disseminated via data feeds.

Financial messages may further be categorized as having or reflecting an impact on a market or electronic marketplace, also referred to as an "order book" or "book," for a traded product, such as a prevailing price therefore, number of resting orders at various price levels and quantities thereof, etc., or not having or reflecting an impact on a market or a subset or portion thereof. In one embodiment, an electronic order book may be understood to be an electronic collection of the outstanding or resting orders for a financial instrument.

For example, a request to place a trade may result in a response indicative of the trade either being matched with, or being rested on an order book to await, a suitable counter-order. This response may include a message directed solely to the trader who submitted the order to acknowledge receipt of the order and report whether it was matched, and the extent thereto, or rested. The response may further include a message to all market participants reporting a change in the order book due to the order. This response may take the form of a report of the specific change to the order book, e.g., an order for quantity X at price Y was added to the book (referred to, in one embodiment, as a Market By Order message), or may simply report the result, e.g., price level Y now has orders for a total quantity of Z (where Z is the sum of the previous resting quantity plus quantity X of the new order). In some cases, requests may elicit a non-impacting response, such as temporally proximate to the receipt of the request, and then cause a separate market-impact reflecting response at a later time. For example, a stop order, fill or kill order (FOK), also known as an immediate or cancel order, or other conditional request may not have an immediate market impacting effect, if at all, until the requisite conditions are met.

An acknowledgement or confirmation of receipt, e.g., a non-market impacting communication, may be sent to the trader simply confirming that the order was received. Upon the conditions being met and a market impacting result thereof occurring, a market-impacting message may be transmitted as described herein both directly back to the submitting market participant and to all market participants (in a Market By Price "MBP" e.g., Aggregated By Value ("ABV") book, or Market By Order "MBO", e.g., Per Order ("PO") book format). It should be appreciated that additional conditions may be specified, such as a time or price limit, which may cause the order to be dropped or otherwise canceled and that such an event may result in another non-market-impacting communication instead. In some implementations, market impacting communications may be communicated separately from non-market impacting communications, such as via a separate communications channel or feed.

For additional details and descriptions of different market data feeds, see U.S. patent application Ser. No. 15/155,565, filed on May 16, 2016, entitled "Systems and Methods for Consolidating Multiple Feed Data", assigned to the assignee of the present application, the entirety of which is incorporated by reference herein and relied upon.

Clearing House

The clearing house of an exchange clears, settles and guarantees matched transactions in contracts occurring through the facilities of the exchange. In addition, the clearing house establishes and monitors financial requirements for clearing members and conveys certain clearing privileges in conjunction with the relevant exchange markets.

The clearing house establishes clearing level performance bonds (margins) for all products of the exchange and establishes minimum performance bond requirements for customers of such products. A performance bond, also referred to as a margin requirement, corresponds with the funds that must be deposited by a customer with his or her broker, by a broker with a clearing member or by a clearing member with the clearing house, for the purpose of insuring the broker or clearing house against loss on open futures or options contracts. This is not a part payment on a purchase. The performance bond helps to ensure the financial integrity of brokers, clearing members and the exchange as a whole. The performance bond refers to the minimum dollar deposit required by the clearing house from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e., a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

The exchange derives its financial stability in large part by removing debt obligations among market participants as they occur. This is accomplished by determining a settlement price at the close of the market each day for each contract and marking all open positions to that price, referred to as "mark to market." Every contract is debited or credited based on that trading session's gains or losses. As prices move for or against a position, funds flow into and out of the trading account. In the case of the CME, each business day by 6:40 a.m. Chicago time, based on the mark-to-the-market of all open positions to the previous trading day's settlement price, the clearing house pays to or collects cash from each clearing member. This cash flow, known as settlement variation, is performed by CME's settlement banks based on instructions issued by the clearing house. All payments to and collections from clearing members are made in "same-day" funds. In addition to the 6:40 a.m. settlement, a daily intra-day mark-to-the market of all open positions, including trades executed during the overnight GLOBEX®, the CME's electronic trading systems, trading session and the current day's trades matched before 11:15 a.m., is performed using current prices. The resulting cash payments are made intra-day for same day value. In times of extreme price volatility, the clearing house has the authority to perform additional intra-day mark-to-the-market calculations on open positions and to call for immediate payment of settlement variation. CME's mark-to-the-market settlement system differs from the settlement systems implemented by many other financial markets, including the interbank, Treasury securities, over-the-counter foreign exchange and debt, options, and equities markets, where participants regularly assume credit exposure to each other. In those markets, the failure of one participant can have a ripple effect on the solvency of the other participants. Conversely, CME's mark-to-the-market system does not allow losses to accumulate over time or allow a market participant the opportunity to defer losses associated with market positions.

While the disclosed embodiments may be described in reference to the CME, it should be appreciated that these embodiments are applicable to any exchange. Such other exchanges may include a clearing house that, like the CME clearing house, clears, settles and guarantees all matched transactions in contracts of the exchange occurring through its facilities. In addition, such clearing houses establish and monitor financial requirements for clearing members and convey certain clearing privileges in conjunction with the relevant exchange markets.

The disclosed embodiments are also not limited to uses by a clearing house or exchange for purposes of enforcing a performance bond or margin requirement. For example, a market participant may use the disclosed embodiments in a simulation or other analysis of a portfolio. In such cases, the settlement price may be useful as an indication of a value at risk and/or cash flow obligation rather than a performance bond. The disclosed embodiments may also be used by market participants or other entities to forecast or predict the effects of a prospective position on the margin requirement of the market participant.

Trading Environment

The embodiments may be described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the principles involved may be extended to, or applied in, other protocols and interfaces.

It should be appreciated that the plurality of entities utilizing or involved with the disclosed embodiments, e.g., the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

An exemplary trading network environment for implementing trading systems and methods is shown in FIG. 1. An exchange computer system 100 receives messages that include orders and transmits market data related to orders and trades to users, such as via wide area network 162 and/or local area network 160 and computer devices 150, 152, 154, 156 and 158, as described herein, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Figure 2:
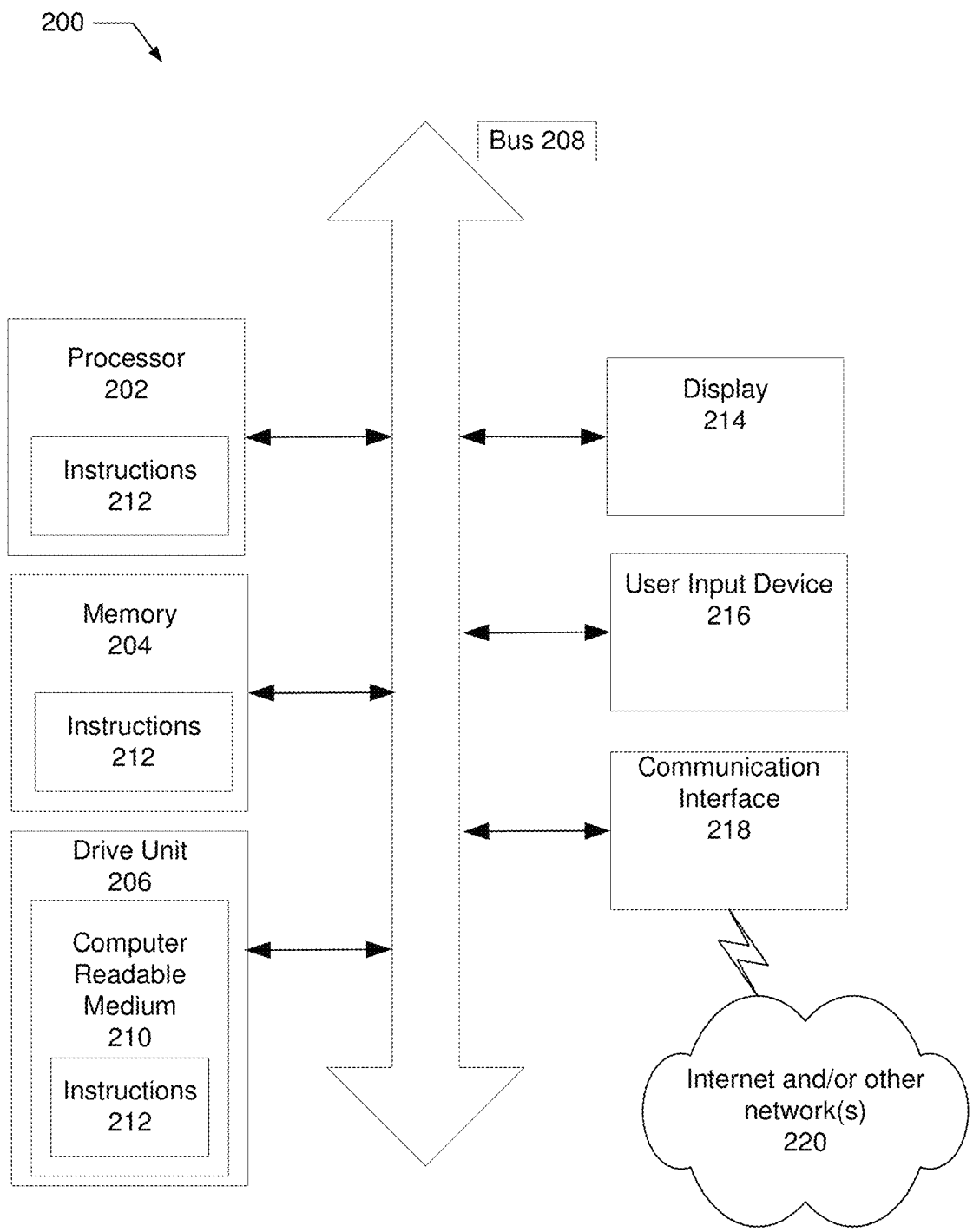
FIG. 2 depicts a general computer system, according to some embodiments.

The exchange computer system 100 may be implemented with one or more mainframe, desktop or other computers, such as the example computer 200 described herein with respect to FIG. 2.

A user database 102 may be provided which includes information identifying traders and other users of exchange computer system 100, such as account numbers or identifiers, user names and passwords. An account data module 104 may be provided which may process account information that may be used during trades.

A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices, e.g., in a continuous auction market, or also operate as an order accumulation buffer for a batch auction market.

A market data module 112 may be included to collect market data and prepare the data for transmission to users.

A risk management module 114 may be included to compute and determine a user's risk utilization in relation to the user's defined risk thresholds. The risk management module 114 may also be configured to determine risk assessments or exposure levels in connection with positions held by a market participant. The risk management module 114 may be configured to administer, manage or maintain one or more margining mechanisms implemented by the exchange computer system 100. Such administration, management or maintenance may include managing a number of database records reflective of margin accounts of the market participants. In some embodiments, the risk management module 114 implements one or more aspects of the disclosed embodiments, including, for instance, principal component analysis (PCA) based margining, in connection with interest rate swap (IRS) portfolio.

A message management module 116 may be included to, among other things, receive, and extract orders from, electronic data transaction request messages. The message management module 116 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure. The message management module 116 processes messages by interpreting the contents of a message based on the message transmit protocol, such as the transmission control protocol ("TCP"), to provide the content of the message for further processing by the exchange computer system.

The message management module 116 may also be configured to detect characteristics of an order for a transaction to be undertaken in an electronic marketplace. For example, the message management module 116 may identify and extract order content such as a price, product, volume, and associated market participant for an order. The message management module 116 may also identify and extract data indicating an action to be executed by the exchange computer system 100 with respect to the extracted order. For example, the message management module 116 may determine the transaction type of the transaction requested in a given message. A message may include an instruction to perform a type of transaction. The transaction type may be, in one embodiment, a request/offer/order to either buy or sell a specified quantity or units of a financial instrument at a specified price or value. The message management module 116 may also identify and extract other order information and other actions associated with the extracted order. All extracted order characteristics, other information, and associated actions extracted from a message for an order may be collectively considered an order as described and referenced herein.

Order or message characteristics may include, for example, the state of the system after a message is received, arrival time (e.g., the time a message arrives at the MSG or Market Segment Gateway), message type (e.g., new, modify, cancel), and the number of matches generated by a message. Order or message characteristics may also include market participant side (e.g., buyer or seller) or time in force (e.g., a good until end of day order that is good for the full trading day, a good until canceled ordered that rests on the order book until matched, or a fill or kill order that is canceled if not filled immediately, or a fill and kill order (FOK) that is filled to the maximum amount possible, and any remaining or unfilled/unsatisfied quantity is not stored on the books or allowed to rest).

An order processing module 118 may be included to decompose delta-based, spread instrument, bulk and other types of composite orders for processing by the order book module 110 and/or the match engine module 106. The order processing module 118 may also be used to implement one or more procedures related to clearing an order. The order may be communicated from the message management module 116 to the order processing module 118. The order processing module 118 may be configured to interpret the communicated order, and manage the order characteristics, other information, and associated actions as they are processed through an order book module 110 and eventually transacted on an electronic market. For example, the order processing module 118 may store the order characteristics and other content and execute the associated actions. In an embodiment, the order processing module may execute an associated action of placing the order into an order book for an electronic trading system managed by the order book module 110. In an embodiment, placing an order into an order book and/or into an electronic trading system may be considered a primary action for an order. The order processing module 118 may be configured in various arrangements, and may be configured as part of the order book module 110, part of the message management module 116, or as an independent functioning module.

As an intermediary to electronic trading transactions, the exchange bears a certain amount of risk in each transaction that takes place. To that end, the clearing house implements risk management mechanisms to protect the exchange. One or more of the modules of the exchange computer system 100 may be configured to determine settlement prices for constituent contracts, such as deferred month contracts, of spread instruments, such as for example, settlement module 120. A settlement module 120 (or settlement processor or other payment processor) may be included to provide one or more functions related to settling or otherwise administering transactions cleared by the exchange. Settlement module 120 of the exchange computer system 100 may implement one or more settlement price determination techniques. Settlement-related functions need not be limited to actions or events occurring at the end of a contract term. For instance, in some embodiments, settlement-related functions may include or involve daily or other mark to market settlements for margining purposes. In some cases, the settlement module 120 may be configured to communicate with the trade database 108 (or the memory(ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 120 may be used to determine a mark to market amount on a daily basis during the term of the financial instrument. Such determinations may also be made on a settlement date for the financial instrument for the purposes of final settlement.

In some embodiments, the settlement module 120 may be integrated to any desired extent with one or more of the other modules or processors of the exchange computer system 100. For example, the settlement module 120 and the risk management module 114 may be integrated to any desired extent. In some cases, one or more margining procedures or other aspects of the margining mechanism(s) may be implemented by the settlement module 120.

A reference rate generation unit 300 may be included for generating a request specific reference rate as described in additional detail below in connection with FIG. 3.

One or more of the above-described modules of the exchange computer system 100 may be used to gather or obtain data to support the settlement price determination, as well as a subsequent margin requirement determination. For example, the order book module 110 and/or the market data module 112 may be used to receive, access, or otherwise obtain market data, such as bid-offer values of orders currently on the order books. The trade database 108 may be used to receive, access, or otherwise obtain trade data indicative of the prices and volumes of trades that were recently executed in a number of markets. In some cases, transaction data (and/or bid/ask data) may be gathered or obtained from open outcry pits and/or other sources and incorporated into the trade and market data from the electronic trading system(s).

It should be appreciated that concurrent processing limits may be defined by or imposed separately or in combination on one or more of the trading system components, including the user database 102, the account data module 104, the match engine module 106, the trade database 108, the order book module 110, the market data module 112, the risk management module 114, the message management module 116, the order processing module 118, the settlement module 120, or other component of the exchange computer system 100.

The disclosed mechanisms may be implemented at any logical and/or physical point(s), or combinations thereof, at which the relevant information/data (e.g., message traffic and responses thereto) may be monitored or flows or is otherwise accessible or measurable, including one or more gateway devices, modems, the computers or terminals of one or more market participants, e.g., client computers, etc.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware or processors, and/or a combination of the aforementioned. For example, the modules may be embodied as part of an exchange 100 for financial instruments. It should be appreciated the disclosed embodiments may be implemented as a different or separate module of the exchange computer system 100, or a separate computer system coupled with the exchange computer system 100 so as to have access to margin account record, pricing, and/or other data. As described herein, the disclosed embodiments may be implemented as a centrally accessible system or as a distributed system, e.g., where some of the disclosed functions are performed by the computer systems of the market participants.

The trading network environment shown in FIG. 1 includes exemplary computer devices 150, 152, 154, 156 and 158 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 150 is shown directly connected to exchange computer system 100, such as via a T1 line, a common local area network (LAN) or other wired and/or wireless medium for connecting computer devices, such as the network 220 shown in FIG. 2 and described with respect thereto. The exemplary computer device 150 is further shown connected to a radio 168. The user of radio 168, which may include a cellular telephone, smart phone, or other wireless proprietary and/or non-proprietary device, may be a trader or exchange employee. The radio user may transmit orders or other information to the exemplary computer device 150 or a user thereof. The user of the exemplary computer device 150, or the exemplary computer device 150 alone and/or autonomously, may then transmit the trade or other information to the exchange computer system 100.

Exemplary computer devices 152 and 154 are coupled with a local area network ("LAN") 160 which may be configured in one or more of the well-known LAN topologies, e.g., star, daisy chain, etc., and may use a variety of different protocols, such as Ethernet, TCP/IP, etc. The exemplary computer devices 152 and 154 may communicate with each other and with other computer and other devices which are coupled with the LAN 160. Computer and other devices may be coupled with the LAN 160 via twisted pair wires, coaxial cable, fiber optics or other wired or wireless media. As shown in FIG. 1, an exemplary wireless personal digital assistant device ("PDA") 158, such as a mobile telephone, tablet based compute device, or other wireless device, may communicate with the LAN 160 and/or the Internet 162 via radio waves, such as via WiFi, Bluetooth and/or a cellular telephone based data communications protocol. PDA 158 may also communicate with exchange computer system 100 via a conventional wireless hub 164.

FIG. 1 also shows the LAN 160 coupled with a wide area network ("WAN") 162 which may be comprised of one or more public or private wired or wireless networks. In one embodiment, the WAN 162 includes the Internet 162. The LAN 160 may include a router to connect LAN 160 to the Internet 162. Exemplary computer device 156 is shown coupled directly to the Internet 162, such as via a modem, DSL line, satellite dish or any other device for connecting a computer device to the Internet 162 via a service provider therefore as is known. LAN 160 and/or WAN 162 may be the same as the network 220 shown in FIG. 2 and described with respect thereto.

Users of the exchange computer system 100 may include one or more market makers 166 which may maintain a market by providing constant bid and offer prices for a derivative or security to the exchange computer system 100, such as via one of the exemplary computer devices depicted. The exchange computer system 100 may also exchange information with other match or trade engines, such as trade engine 170. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium.

For example, the exemplary computer device 152 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 154 may include computer-executable instructions for receiving market data from exchange computer system 100 and displaying that information to a user.

Numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

Referring now to FIG. 2, an illustrative embodiment of a general computer system 200 is shown. The computer system 200 can include a set of instructions that can be executed to cause the computer system 200 to perform any one or more of the methods or computer based functions disclosed herein. The computer system 200 may operate as a standalone device or may be connected, e.g., using a network, to other computer systems or peripheral devices. Any of the components discussed herein, such as processor 202, may be a computer system 200 or a component in the computer system 200. The computer system 200 may be specifically configured to implement a match engine, margin processing, payment or clearing function on behalf of an exchange, such as the Chicago Mercantile Exchange, of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In a particular embodiment, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed herein.

The present disclosure contemplates a computer-readable medium that includes instructions 212 or receives and executes instructions 212 responsive to a propagated signal, so that a device connected to a network 220 can communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

As used herein, the terms "microprocessor" or "general-purpose processor" ("GPP") may refer to a hardware device that fetches instructions and data from a memory or storage device and executes those instructions (for example, an Intel Xeon processor or an AMD Opteron processor) to then, for example, process the data in accordance therewith. The term "reconfigurable logic" may refer to any logic technology whose form and function can be significantly altered (i.e., reconfigured) in the field post-manufacture as opposed to a microprocessor, whose function can change post-manufacture, e.g. via computer executable software code, but whose form, e.g. the arrangement/layout and interconnection of logical structures, is fixed at manufacture. The term "software" may refer to data processing functionality that is deployed on a GPP. The term "firmware" may refer to data processing functionality that is deployed on reconfigurable logic. One example of a reconfigurable logic is a field programmable gate array ("FPGA") which is a reconfigurable integrated circuit. An FPGA may contain programmable logic components called "logic blocks", and a hierarchy of reconfigurable interconnects that allow the blocks to be "wired together", somewhat like many (changeable) logic gates that can be inter-wired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the disclosed embodiments may be applicable to other types of messages depending upon the implementation. Further, the messages may comprise one or more data packets, datagrams or other collection of data formatted, arranged configured and/or packaged in a particular one or more protocols, e.g., the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in their entireties and relied upon. Further, the disclosed message management system may be implemented using an open message standard implementation, such as FIX, FIX Binary, FIX/FAST, or by an exchange-provided API.

The embodiments described herein utilize trade related electronic messages such as mass quote messages, individual order messages, modification messages, cancellation messages, etc., so as to enact trading activity in an electronic market. The trading entity and/or market participant may have one or multiple trading terminals associated with the session. Furthermore, the financial instruments may be financial derivative products. Derivative products may include futures contracts, options on futures contracts, futures contracts that are functions of or related to other futures contracts, swaps, swaptions, or other financial instruments that have their price related to or derived from an underlying product, security, commodity, equity, index, or interest rate product. In one embodiment, the orders are for options contracts that belong to a common option class. Orders may also be for baskets, quadrants, other combinations of financial instruments, etc. The option contracts may have a plurality of strike prices and/or comprise put and call contracts. A mass quote message may be received at an exchange. As used herein, an exchange computing system 100 includes a place or system that receives and/or executes orders.

In an embodiment, a plurality of electronic messages is received from the network. The plurality of electronic messages may be received at a network interface for the electronic trading system. The plurality of electronic messages may be sent from market participants. The plurality of messages may include order characteristics and be associated with actions to be executed with respect to an order that may be extracted from the order characteristics. The action may involve any action as associated with transacting the order in an electronic trading system. The actions may involve placing the orders within a particular market and/or order book of a market in the electronic trading system.

In an embodiment, an incoming transaction may be received. The incoming transaction may be from, and therefore associated with, a market participant of an electronic market managed by an electronic trading system. The transaction may involve an order as extracted from a received message, and may have an associated action. The actions may involve placing an order to buy or sell a financial product in the electronic market, or modifying or deleting such an order. In an embodiment, the financial product may be based on an associated financial instrument which the electronic market is established to trade.

In an embodiment, the action associated with the transaction is determined. For example, it may be determined whether the incoming transaction comprises an order to buy or sell a quantity of the associated financial instrument or an order to modify or cancel an existing order in the electronic market. Orders to buy or sell and orders to modify or cancel may be acted upon differently by the electronic market. For example, data indicative of different characteristics of the types of orders may be stored.

In an embodiment, data relating to the received transaction is stored. The data may be stored in any device, or using any technique, operable to store and provide recovery of data. For example, a memory 204 or computer readable medium 210, may be used to store data, as is described with respect to FIG. 2 in further detail herein. Data may be stored relating received transactions for a period of time, indefinitely, or for a rolling most recent time period such that the stored data is indicative of the market participant's recent activity in the electronic market.

If and/or when a transaction is determined to be an order to modify or cancel a previously placed, or existing, order, data indicative of these actions may be stored. For example, data indicative of a running count of a number or frequency of the receipt of modify or cancel orders from the market participant may be stored. A number may be a total number of modify or cancel orders received from the market participant, or a number of modify or cancel orders received from the market participant over a specified time. A frequency may be a time based frequency, as in a number of cancel or modify orders per unit of time, or a number of cancel or modify orders received from the market participant as a percentage of total transactions received from the participant, which may or may not be limited by a specified length of time.

If and/or when a transaction is determined to be an order to buy or sell a financial product, or financial instrument, other indicative data may be stored. For example, data indicative of quantity and associated price of the order to buy or sell may be stored.

Data indicative of attempts to match incoming orders may also be stored. The data may be stored in any device, or using any technique, operable to store and provide recovery of data. For example, a memory 204 or computer readable medium 210, may be used to store data, as is described with respect to FIG. 2. The acts of the process as described herein may also be repeated. As such, data for multiple received transactions for multiple market participants may be stored and used as describe herein.

The order processing module 118 may also store data indicative of characteristics of the extracted orders. For example, the order processing module may store data indicative of orders having an associated modify or cancel action, such as by recording a count of the number of such orders associated with particular market participants. The order processing module may also store data indicative of quantities and associated prices of orders to buy or sell a product placed in the market order book 110, as associated with particular market participants.

Also, the order processing module 118 may be configured to calculate and associate with particular orders a value indicative of an associated market participant's market activity quality, which is a value indicative of whether the market participant's market activity increases or tends to increase liquidity of a market. This value may be determined based on the price of the particular order, previously stored quantities of orders from the associated market participant, the previously stored data indicative of previously received orders to modify or cancel as associated with the market participant, and previously stored data indicative of a result of the attempt to match previously received orders stored in association with the market participant. The order processing module 118 may determine or otherwise calculate scores indicative of the quality value based on these stored extracted order characteristics, such as an MQI as described herein.

Further, electronic trading systems may perform actions on orders placed from received messages based on various characteristics of the messages and/or market participants associated with the messages. These actions may include matching the orders either during a continuous auction process, or at the conclusion of a collection period during a batch auction process. The matching of orders may be by any technique.

The matching of orders may occur based on a priority indicated by the characteristics of orders and market participants associated with the orders. Orders having a higher priority may be matched before orders of a lower priority. Such priority may be determined using various techniques. For example, orders that were indicated by messages received earlier may receive a higher priority to match than orders that were indicated by messages received later. Also, scoring or grading of the characteristics may provide for priority determination. Data indicative of order matches may be stored by a match engine and/or an order processing module 118, and used for determining MQI scores of market participants.

Example Users

Generally, a market may involve market makers, such as market participants who consistently provide bids and/or offers at specific prices in a manner typically conducive to balancing risk, and market takers who may be willing to execute transactions at prevailing bids or offers may be characterized by more aggressive actions so as to maintain risk and/or exposure as a speculative investment strategy. From an alternate perspective, a market maker may be considered a market participant who places an order to sell at a price at which there is no previously or concurrently provided counter order. Similarly, a market taker may be considered a market participant who places an order to buy at a price at which there is a previously or concurrently provided counter order. A balanced and efficient market may involve both market makers and market takers, coexisting in a mutually beneficial basis. The mutual existence, when functioning properly, may facilitate liquidity in the market such that a market may exist with "tight" bid-ask spreads (e.g., small difference between bid and ask prices) and a "deep" volume from many currently provided orders such that large quantity orders may be executed without driving prices significantly higher or lower.

As such, both market participant types are useful in generating liquidity in a market, but specific characteristics of market activity taken by market participants may provide an indication of a particular market participant's effect on market liquidity. For example, a Market Quality Index ("MQI") of an order may be determined using the characteristics. An MQI may be considered a value indicating a likelihood that a particular order will improve or facilitate liquidity in a market. That is, the value may indicate a likelihood that the order will increase a probability that subsequent requests and transaction from other market participants will be satisfied. As such, an MQI may be determined based on a proximity of the entered price of an order to a midpoint of a current bid-ask price spread, a size of the entered order, a volume or quantity of previously filled orders of the market participant associated with the order, and/or a frequency of modifications to previous orders of the market participant associated with the order. In this way, an electronic trading system may function to assess and/or assign an MQI to received electronic messages to establish messages that have a higher value to the system, and thus the system may use computing resources more efficiently by expending resources to match orders of the higher value messages prior to expending resources of lower value messages.

While an MQI may be applied to any or all market participants, such an index may also be applied only to a subset thereof, such as large market participants, or market participants whose market activity as measured in terms of average daily message traffic over a limited historical time period exceeds a specified number. For example, a market participant generating more than 500, 1,000, or even 10,000 market messages per day may be considered a large market participant.

An exchange provides one or more markets for the purchase and sale of various types of products including financial instruments such as stocks, bonds, futures contracts, options, currency, cash, and other similar instruments. Agricultural products and commodities are also examples of products traded on such exchanges. A futures contract is a product that is a contract for the future delivery of another financial instrument such as a quantity of grains, metals, oils, bonds, currency, or cash. Generally, each exchange establishes a specification for each market provided thereby that defines at least the product traded in the market, minimum quantities that must be traded, and minimum changes in price (e.g., tick size). For some types of products (e.g., futures or options), the specification further defines a quantity of the underlying product represented by one unit (or lot) of the product, and delivery and expiration dates. As will be described, the exchange may further define the matching algorithm, or rules, by which incoming orders will be matched/allocated to resting orders.

Matching and Transaction Processing

Market participants, e.g., traders, use software to send orders or messages to the trading platform. The order identifies the product, the quantity of the product the trader wishes to trade, a price at which the trader wishes to trade the product, and a direction of the order (i.e., whether the order is a bid, i.e., an offer to buy, or an ask, i.e., an offer to sell). It will be appreciated that there may be other order types or messages that traders can send including requests to modify or cancel a previously submitted order.

The exchange computer system monitors incoming orders received thereby and attempts to identify, i.e., match or allocate, as described herein, one or more previously received, but not yet matched, orders, i.e., limit orders to buy or sell a given quantity at a given price, referred to as "resting" orders, stored in an order book database, wherein each identified order is contra to the incoming order and has a favorable price relative to the incoming order. An incoming order may be an "aggressor" order, i.e., a market order to sell a given quantity at whatever may be the current resting bid order price(s) or a market order to buy a given quantity at whatever may be the current resting ask order price(s). An incoming order may be a "market making" order, i.e., a market order to buy or sell at a price for which there are currently no resting orders. In particular, if the incoming order is a bid, i.e., an offer to buy, then the identified order(s) will be an ask, i.e., an offer to sell, at a price that is identical to or higher than the bid price. Similarly, if the incoming order is an ask, i.e., an offer to sell, the identified order(s) will be a bid, i.e., an offer to buy, at a price that is identical to or lower than the offer price.

An exchange computing system may receive conditional orders or messages for a data object, where the order may include two prices or values: a reference value and a stop value. A conditional order may be configured so that when a product represented by the data object trades at the reference price, the stop order is activated at the stop value. For example, if the exchange computing system's order management module includes a stop order with a stop price of 5 and a limit price of 1 for a product, and a trade at 5 (i.e., the stop price of the stop order) occurs, then the exchange computing system attempts to trade at 1 (i.e., the limit price of the stop order). In other words, a stop order is a conditional order to trade (or execute) at the limit price that is triggered (or elected) when a trade at the stop price occurs.

Stop orders also rest on, or are maintained in, an order book to monitor for a trade at the stop price, which triggers an attempted trade at the limit price. In some embodiments, a triggered limit price for a stop order may be treated as an incoming order.

Upon identification (matching) of a contra order(s), a minimum of the quantities associated with the identified order and the incoming order is matched and that quantity of each of the identified and incoming orders become two halves of a matched trade that is sent to a clearing house. The exchange computer system considers each identified order in this manner until either all of the identified orders have been considered or all of the quantity associated with the incoming order has been matched, i.e., the order has been filled. If any quantity of the incoming order remains, an entry may be created in the order book database and information regarding the incoming order is recorded therein, i.e., a resting order is placed on the order book for the remaining quantity to await a subsequent incoming order counter thereto.

It should be appreciated that in electronic trading systems implemented via an exchange computing system, a trade price (or match value) may differ from (i.e., be better for the submitter, e.g., lower than a submitted buy price or higher than a submitted sell price) the limit price that is submitted, e.g., a price included in an incoming message, or a triggered limit price from a stop order.

As used herein, "better" than a reference value means lower than the reference value if the transaction is a purchase (or acquire) transaction, and higher than the reference value if the transaction is a sell transaction. Said another way, for purchase (or acquire) transactions, lower values are better, and for relinquish or sell transactions, higher values are better.

Traders access the markets on a trading platform using trading software that receives and displays at least a portion of the order book for a market, i.e., at least a portion of the currently resting orders, enables a trader to provide parameters for an order for the product traded in the market, and transmits the order to the exchange computer system. The trading software typically includes a graphical user interface to display at least a price and quantity of some of the entries in the order book associated with the market. The number of entries of the order book displayed is generally preconfigured by the trading software, limited by the exchange computer system, or customized by the user. Some graphical user interfaces display order books of multiple markets of one or more trading platforms. The trader may be an individual who trades on his/her behalf, a broker trading on behalf of another person or entity, a group, or an entity. Furthermore, the trader may be a system that automatically generates and submits orders.

If the exchange computer system identifies that an incoming market order may be filled by a combination of multiple resting orders, e.g., the resting order at the best price only partially fills the incoming order, the exchange computer system may allocate the remaining quantity of the incoming, i.e., that which was not filled by the resting order at the best price, among such identified orders in accordance with prioritization and allocation rules/algorithms, referred to as "allocation algorithms" or "matching algorithms," as, for example, may be defined in the specification of the particular financial product or defined by the exchange for multiple financial products. Similarly, if the exchange computer system identifies multiple orders contra to the incoming limit order and that have an identical price which is favorable to the price of the incoming order, i.e., the price is equal to or better, e.g., lower if the incoming order is a buy (or instruction to purchase, or instruction to acquire) or higher if the incoming order is a sell (or instruction to relinquish), than the price of the incoming order, the exchange computer system may allocate the quantity of the incoming order among such identified orders in accordance with the matching algorithms as, for example, may be defined in the specification of the particular financial product or defined by the exchange for multiple financial products.

An exchange responds to inputs, such as trader orders, cancellation, etc., in a manner as expected by the market participants, such as based on market data, e.g., prices, available counter-orders, etc., to provide an expected level of certainty that transactions will occur in a consistent and predictable manner and without unknown or unascertainable risks. Accordingly, the method by which incoming orders are matched with resting orders must be defined so that market participants have an expectation of what the result will be when they place an order or have resting orders and an incoming order is received, even if the expected result is, in fact, at least partially unpredictable due to some component of the process being random or arbitrary or due to market participants having imperfect or less than all information, e.g., unknown position of an order in an order book. Typically, the exchange defines the matching/allocation algorithm that will be used for a particular financial product, with or without input from the market participants. Once defined for a particular product, the matching/allocation algorithm is typically not altered, except in limited circumstance, such as to correct errors or improve operation, so as not to disrupt trader expectations. It will be appreciated that different products offered by a particular exchange may use different matching algorithms.

For example, a first-in/first-out (FIFO) matching algorithm, also referred to as a "Price Time" algorithm, considers each identified order sequentially in accordance with when the identified order was received. The quantity of the incoming order is matched to the quantity of the identified order at the best price received earliest, then quantities of the next earliest best price orders, and so on until the quantity of the incoming order is exhausted. Some product specifications define the use of a pro-rata matching algorithm, wherein a quantity of an incoming order is allocated to each of plurality of identified orders proportionally. Some exchange computer systems provide a priority to certain standing orders in particular markets. An example of such an order is the first order that improves a price (i.e., improves the market) for the product during a trading session. To be given priority, the trading platform may require that the quantity associated with the order is at least a minimum quantity. Further, some exchange computer systems cap the quantity of an incoming order that is allocated to a standing order on the basis of a priority for certain markets. In addition, some exchange computer systems may give a preference to orders submitted by a trader who is designated as a market maker for the product. Other exchange computer systems may use other criteria to determine whether orders submitted by a particular trader are given a preference. Typically, when the exchange computer system allocates a quantity of an incoming order to a plurality of identified orders at the same price, the trading host allocates a quantity of the incoming order to any orders that have been given priority. The exchange computer system thereafter allocates any remaining quantity of the incoming order to orders submitted by traders designated to have a preference, and then allocates any still remaining quantity of the incoming order using the FIFO or pro-rata algorithms. Pro-rata algorithms used in some markets may require that an allocation provided to a particular order in accordance with the pro-rata algorithm must meet at least a minimum allocation quantity. Any orders that do not meet or exceed the minimum allocation quantity are allocated to on a FIFO basis after the pro-rata allocation (if any quantity of the incoming order remains). More information regarding order allocation may be found in U.S. Pat. No. 7,853,499, the entirety of which is incorporated by reference herein and relied upon. Other examples of matching algorithms which may be defined for allocation of orders of a particular financial product include: Price Explicit Time; Order Level Pro Rata; Order Level Priority Pro Rata; Preference Price Explicit Time; Preference Order Level Pro Rata; Preference Order Level Priority Pro Rata; Threshold Pro-Rata; Priority Threshold Pro-Rata; Preference Threshold Pro-Rata; Priority Preference Threshold Pro-Rata; and Split Price-Time Pro-Rata, which are described in U.S. patent application Ser. No. 13/534,499, filed on Jun. 27, 2012, entitled "Multiple Trade Matching Algorithms," published as U.S. Patent Application Publication No. 2014/0006243 A1, the entirety of which is incorporated by reference herein and relied upon.

With respect to incoming orders, some traders, such as automated and/or algorithmic traders, attempt to respond to market events, such as to capitalize upon a mispriced resting order or other market inefficiency, as quickly as possible. This may result in penalizing the trader who makes an errant trade, or whose underlying trading motivations have changed, and who cannot otherwise modify or cancel their order faster than other traders can submit trades there against. It may considered that an electronic trading system that rewards the trader who submits their order first creates an incentive to either invest substantial capital in faster trading systems, participate in the market substantially to capitalize on opportunities (aggressor side/lower risk trading) as opposed to creating new opportunities (market making/higher risk trading), modify existing systems to streamline business logic at the cost of trade quality, or reduce one's activities and exposure in the market. The result may be a lesser quality market and/or reduced transaction volume, and corresponding thereto, reduced fees to the exchange.

With respect to resting orders, allocation/matching suitable resting orders to match against an incoming order can be performed, as described herein, in many different ways. Generally, it will be appreciated that allocation/matching algorithms are only needed when the incoming order quantity is less than the total quantity of the suitable resting orders as, only in this situation, is it necessary to decide which resting order(s) will not be fully satisfied, which trader(s) will not get their orders filled. It can be seen from the above descriptions of the matching/allocation algorithms, that they fall generally into three categories: time priority/first-in-first-out ("FIFO"), pro rata, or a hybrid of FIFO and pro rata.

FIFO generally rewards the first trader to place an order at a particular price and maintains this reward indefinitely. So if a trader is the first to place an order at price X, no matter how long that order rests and no matter how many orders may follow at the same price, as soon as a suitable incoming order is received, that first trader will be matched first. This "first mover" system may commit other traders to positions in the queue after the first move traders. Furthermore, while it may be beneficial to give priority to a trader who is first to place an order at a given price because that trader is, in effect, taking a risk, the longer that the trader's order rests, the less beneficial it may be. For instance, it could deter other traders from adding liquidity to the marketplace at that price because they know the first mover (and potentially others) already occupies the front of the queue.

With a pro rata allocation, incoming orders are effectively split among suitable resting orders. This provides a sense of fairness in that everyone may get some of their order filled. However, a trader who took a risk by being first to place an order (a "market turning" order) at a price may end up having to share an incoming order with a much later submitted order. Furthermore, as a pro rata allocation distributes the incoming order according to a proportion based on the resting order quantities, traders may place orders for large quantities, which they are willing to trade but may not necessarily want to trade, in order to increase the proportion of an incoming order that they will receive. This results in an escalation of quantities on the order book and exposes a trader to a risk that someone may trade against one of these orders and subject the trader to a larger trade than they intended. In the typical case, once an incoming order is allocated against these large resting orders, the traders subsequently cancel the remaining resting quantity which may frustrate other traders. Accordingly, as FIFO and pro rata both have benefits and problems, exchanges may try to use hybrid allocation/matching algorithms which attempt to balance these benefits and problems by combining FIFO and pro rata in some manner. However, hybrid systems define conditions or fixed rules to determine when FIFO should be used and when pro rata should be used. For example, a fixed percentage of an incoming order may be allocated using a FIFO mechanism with the remainder being allocated pro rata.

Reference Rate Generation Unit

Figure 3:
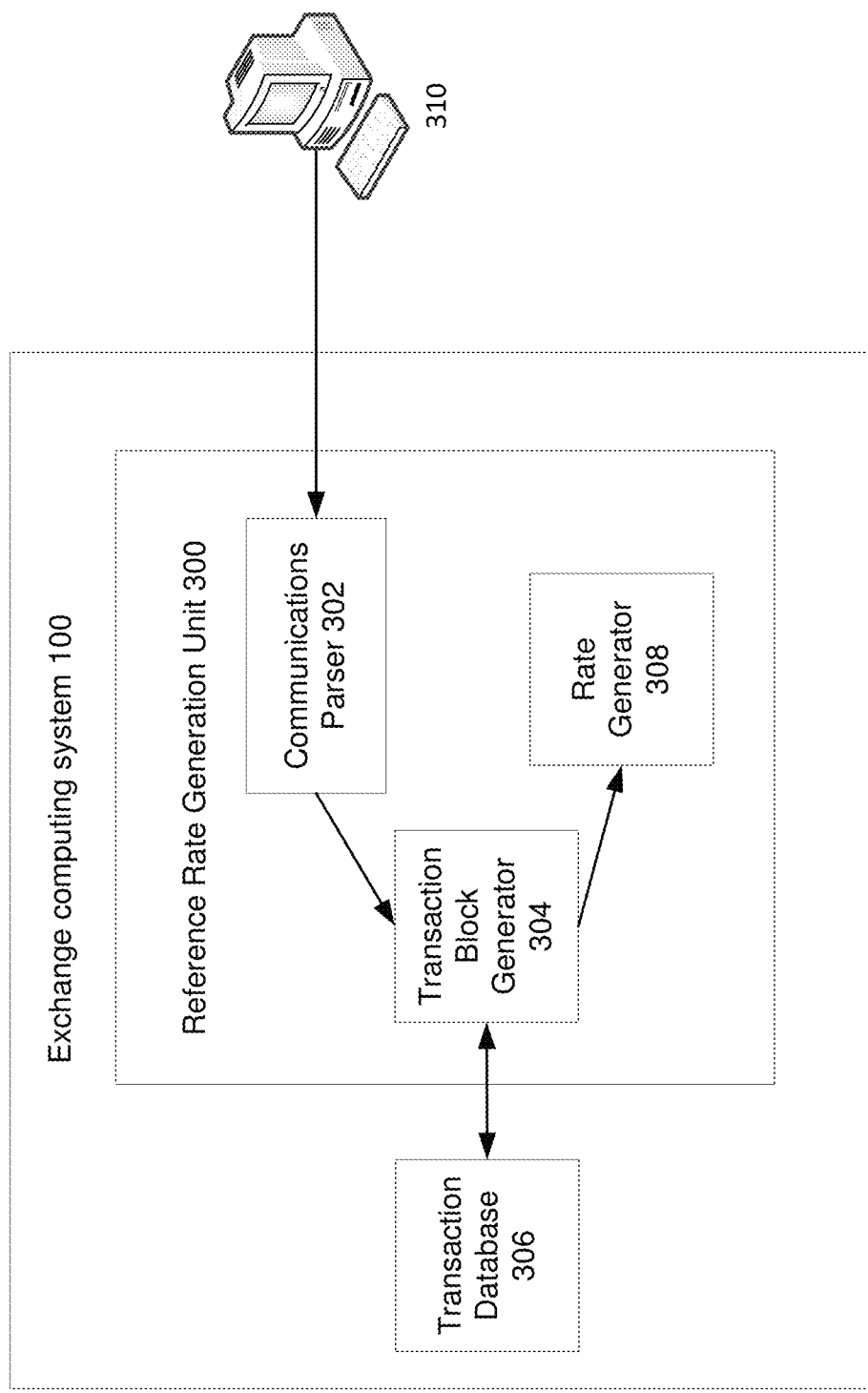
FIG. 3 depicts a block diagram of an exchange computing system including a reference rate generation unit, according to some embodiments.

FIG. 3 illustrates a block diagram of an exchange computing system 100 that includes reference rate generation unit 300. Reference rate generation unit 300 includes a communications parser 302, which may be implemented as a separate component or as one or more logic components, such as on an FPGA which may include a memory or reconfigurable component to store logic and processing component to execute the stored logic, e.g. computer program logic, stored in a memory 204, or other non-transitory computer readable medium, and executable by a processor 202, such as the processor 202 and memory 204 described with respect to FIG. 2, to cause the processor 202 to parse a received communication, which may be a request for a reference rate, and identify fixed parameters from the communication. The request may be transmitted from a computer 310 associated with a party or entity about to enter into a transaction that requires a reference rate.

Reference rate generation unit 300 also includes a transaction block generator 304, which may be implemented as a separate component or as one or more logic components, such as on an FPGA which may include a memory or reconfigurable component to store logic and processing component to execute the stored logic, e.g. computer program logic, stored in a memory 204, or other non-transitory computer readable medium, and executable by a processor 202, such as the processor 202 and memory 204 described with respect to FIG. 2, to cause the processor 202 to generate a transaction block based on the request.

The reference rate generation unit 300 may be operatively coupled to a transaction database 306 which includes a plurality of previously executed transactions. The transactions could be transactions for a wide variety of financial instruments, such as mortgage loans, student loans, treasury notes, treasury bonds, municipal bonds, certificate of deposit purchases, etc. The transactions could be any type of transaction that relies on an interest rate, or uses an interest rate. The transactions may be transactions in debt-related instruments.

The transactions may be previously executed transactions that are executed by a financial institution. The financial institution may characterize each transaction in terms of type, quality and duration. The characterizations may be standardized, so that institutions that want to participate in the reference rate generation method would be required to assign the same meaning to type, quality and duration, as discussed in further detail below.

Reference rate generation unit 300 also includes a rate generator 308, which may be implemented as a separate component or as one or more logic components, such as on an FPGA which may include a memory or reconfigurable component to store logic and processing component to execute the stored logic, e.g. computer program logic, stored in a memory 204, or other non-transitory computer readable medium, and executable by a processor 202, such as the processor 202 and memory 204 described with respect to FIG. 2, to cause the processor 202 to generate a request specific rate based on the transaction block generated by the transaction block generator 304.

Figure 4:
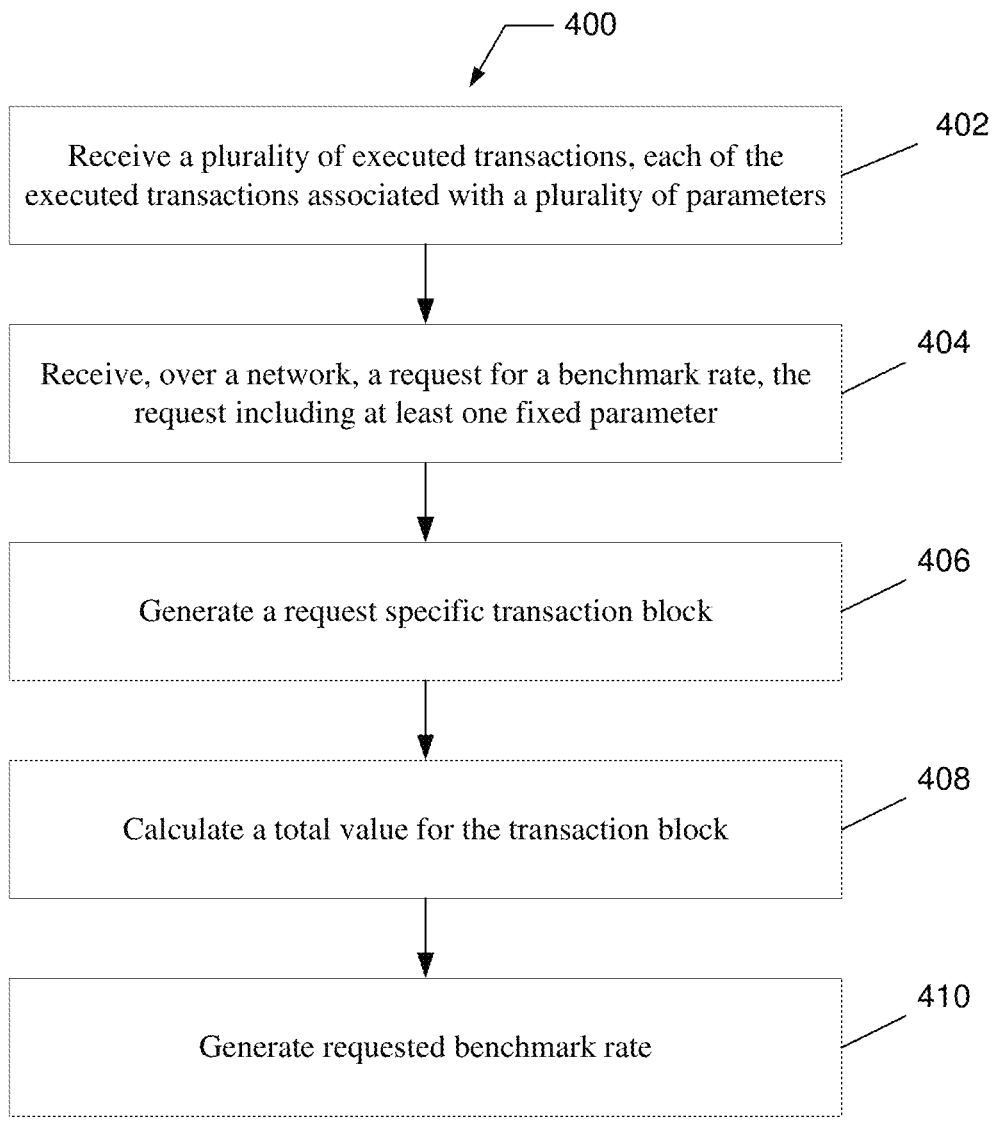
FIG. 4 depicts a high-level flowchart illustrating a method for generating a request specific benchmark rate, according to some embodiments.

FIG. 4 illustrates an example flowchart of an example computer implemented method 400 of generating a request specific reference rate. Embodiments may involve all, more or fewer actions than the illustrated actions. The actions may be performed in the order or sequence shown, or in a different sequence. The actions may be performed simultaneously, or in a parallel or overlapping fashion. The method may be performed by processing logic that may comprise hardware (circuitry, dedicated logic, etc.), software, or a combination of both. In one example, the method is performed by the computer system 100 of FIG. 1, while in some other examples, some or all of the method may be performed by another machine.

At step 402, method 400 includes receiving a plurality of executed transactions, each of the executed transactions associated with a plurality of parameters including a rate, type, quality, duration, and value.

The transactions may be stored in a blockchain or a permissioned database, or a transaction repository. If the method 400 is implemented by an exchange computing system 100, the exchange computing system may be the central authority of the blockchain/permissioned database, and would have permission to read individual transactions.

The transactions could be transactions for a wide variety of financial instruments, such as mortgage loans, student loans, treasury notes, treasury bonds, municipal bonds, certificate of deposit purchases, etc. The transactions may be transactions in debt-related instruments.

The transactions may be previously executed transactions that are executed by a financial institution. The financial institution may characterize each transaction in terms of type, quality and duration. The characterizations may be standardized, so that institutions that want to participate in the reference rate generation method would be required to assign the same meaning to type, quality and duration.

The type refers to the transaction type, such as mortgage loans, student loans, treasury notes, treasury bonds, municipal bonds, certificate of deposit purchases, etc.

The quality refers to a quality designation assigned by the financial institution. For example, quality could be prime, or prime plus a basis. The quality designation allows the financial institution if there was a credit component or a credit risk component to the rate.

The duration refers to the term or duration of the transaction.

In one embodiment, instead of the financial institution characterizing each transaction in terms of type, quality and duration, the exchange computing system accesses a transaction repository that stores previously executed transactions, and characterizes each transaction in these terms.

At step 404, method 400 includes receiving a request for a benchmark rate, the request including at least one fixed parameter, the fixed parameter one of a type, quality, duration and value.

The request may be from one or more of entities considering entering into a to-be-executed transaction. The request may be a message transmitted from the entity to the exchange computing system. The entities may wish to base the to-be-executed transaction on a reference rate. The disclosed embodiments allows the contracting entities to select a reference rate for their to-be-executed transaction that is based on similar or relevant previously executed transactions, thus increasing the relevance of the reference rate to the to-be-executed transaction.

For example, marketplace lending is a rapidly growing area in the consumer financial services space. Marketplace lending is the process of matching non-bank lenders to borrowers or investors. Two or more contracting parties may be interested in executing a transaction for marketplace lending, and may wish to use a reference rate relevant to, or based on, loans transacted on marketplace lending platforms. The request received by the exchange computing system may include a fixed parameter, e.g., it may specify type as "marketplace lending". Or, the request may specify mortgages by quality. Or, the request may specify mortgages by duration.

At step 406, method 400 includes generating a request specific transaction block that includes a subset of the plurality of executed transactions based on the fixed parameter. A transaction block may refer to a group of executed transactions stored in a memory.

For example, the reference rate generation unit 300 may filter the plurality of executed transactions based on the at least one fixed parameter in the request. The reference rate generation unit 300 may generate the transaction block so that only executed transactions that match or correspond to the fixed parameter are in the transaction block. For example, if the request includes a fixed parameter for transaction type, which is specified to be marketplace lending, the reference rate generation unit 300 generates a transaction block that includes all previously executed transactions having marketplace lending as the transaction type.

The request may include more than one fixed parameter. For example, a request may be for a 30-year home mortgage from a prime consumer. Accordingly, this request includes several fixed parameters:

Duration: 30 years
Transaction Type: Home Mortgage
Quality: Prime

The reference rate generation unit 300 then generates a transaction block that matches these fixed parameters from the request. In other words, the reference rate generation unit 300 generates a transaction block that includes all the transactions from the plurality of transactions that are for a 30-year home mortgage from a prime consumer.

In another illustrative embodiment, a request may be a request for a 10-year credit deposit held by a bank. Accordingly, this request also includes several fixed parameters:

Duration: 10 years
Transaction Type: Credit Deposit held by a Bank

The reference rate generation unit 300 then generates a transaction block that matches these fixed parameters from the request. In other words, the reference rate generation unit 300 generates a transaction block that includes all the transactions from the plurality of transactions that are for a 10-year credit deposit held by a bank.

At step 408, method 400 includes calculating a total value for the generated transaction block by summing up the values associated with the executed transactions in the transaction block. As described above, each of the executed transactions is associated with a value. The reference rate generation unit 300 implementing method 400 determines a total value of the transaction block by adding up the values of all the transactions in the transaction block.

Accordingly, a reference rate generation unit 300 implementing method 400 provides customized benchmarking rates that is based on transactions. The transactions may be consumer level transactions. A customized benchmark can be used to more accurately define sectors and to replace traditional lending rate benchmarks. For example, as described above, the LIBOR rate represents the costs that each bank would face if it received an unsecured deposit from another bank. The disclosed embodiments allow two transacting parties to receive, from a central, independent authority such as an exchange computing system, a customized reference rate that is based on actual executed transactions and that is more relevant to the actual transaction being performed. For example, a party interested in building a home addition, e.g., adding space for an additional car to a garage, may wish to secure a loan from a lender. The parties may wish to structure the transaction so that the interest rate of the loan is based on a reference rate. However, using LIBOR or some other existing standardized reference rate may be undesirable because the reference rate is unrelated to the underlying transaction, e.g., the reference rate may include student loan transactions. The cost of banks lending to each other (e.g., LIBOR) may be perceived by the transacting parties as having little or no bearing on the costs associated with improving a home garage (e.g., labor costs, material costs, etc.). The parties may instead wish to base their transaction on a rate related to the underlying transaction. The disclosed embodiments accordingly enable the parties to submit a request for a reference rate that is closely tied to the underlying transaction, and which is based on actual transactions previously executed by other institutions. The request may specify a fixed parameter as the transaction type. For example, the transaction type may be Home Improvements.

The reference rate generation unit 300 also affords a high degree of flexibility for the transacting parties. The parties are free to decide which parameters are fixed. If a party does not fix a parameter, or specify a value (or range of values) for a parameter, the reference rate generation unit aggregates transactions across all unspecified (or not fixed) parameters. For example, if a request only specifies the transaction type as Home Mortgages, but does not specify duration, the reference rate generation unit generates a transaction block that includes all previously executed transactions for home mortgages without performing any duration-based filtering. But, if a request specifies the transaction type as Home Mortgages and specifies the duration as 10 years, the reference rate generation unit filters out any transactions in the transaction repository/database that are for 30 year home mortgage loans.

Accordingly, the transacting parties (who submit the request for a reference rate) are free to select the granularity of the request, which will result in non-matching previously executed transactions being filtered out of the transaction block used to generate the request specific reference rate.

At step 410, method 400 includes generating the requested benchmark rate by weighting the rate of each executed transaction in the transaction block with the value of the executed transaction divided by the total value of the transaction block.

Accordingly, the reference rate generation unit 300 calculates a requested benchmark rate as:

Benchmark Rate= (Rate_transaction*Value_transaction)/(TotalValue)

where:
Rate_transaction=the rate of a given executed transaction
Value_transaction=the value of the same executed transaction
TotalValue=the sum of all the values of the transactions in a transaction block.

Financial Instrument Based on Reference Rate Generation Unit

In some embodiments, the systems and methods as disclosed herein also relate to listing, or making available for trading, and clearing contracts, e.g., financial instruments, based on a request specific reference rate. The contracts can be configured for trading using financial computer systems such as, for example, computer systems associated with a futures exchange (e.g., the Chicago Mercantile Exchange, Inc.).

Derivatives contracts may take many forms including, for example, futures contracts and over-the-counter (OTC) swap contracts. A futures contract is an instrument that may be bought or sold and obligate the buyer or seller to accept or make delivery of a particular instrument on a specified future date or during a specified future period. Typically, these contracts are identified by reference to the contract month which specifies when the delivery must take place. Upon delivery, a seller makes delivery of the specified quantity and quality of instrument, and the buyer accepts such delivery in return for a cash payment in a specified legal tender. For example, a given contract may require the delivery of 5,000 bushels of soybeans for an equivalent amount of USD. Another exemplary contract may require the delivery of 125,000 Euros for an equivalent amount of USD. Certain futures contracts are cash settled. That is, these futures contracts do not culminate in the delivery of a particular item for legal tender but instead, are settled by reference to a measure of the value in a specified legal tender of the subject item and expire thereupon.

An OTC swap contract may operate in a similar manner to a futures contract. OTC swap contracts, however, are generally regulated under a different set of laws and regulations than futures contracts. In spite of the different laws and regulations, OTC swap contracts can optionally be constructed similarly to futures contracts from an economic and functional standpoint.

Derivative contracts or instruments may also be constructed in the form of securities. Examples of these securities include Exchange Traded Funds (ETFs), certificates, and warrants. Currently, upwards of 90% of all global ETF trade is conducted in the U.S., while certificates and warrants are more popular on European exchanges.

Additionally, while derivative contracts generally contemplate final settlement via delivery or cash settlement, they may be traded such that the obligation to make or take delivery is offset by a counteracting transaction before the delivery day or period is reached. That is, a party can buy a futures contract one day and sell it at any time thereafter and prior to the delivery date or period. Therefore, the original obligation is offset without actually facilitating a delivery.

Among other things, derivatives contracts allow investors to minimize risk by providing offsetting compensation in case of an undesired event. Derivatives contracts may be used, for example, to minimize the risk associated with unexpectedly rising or falling prices of utilities or farm commodities.

The contract may be settled, for example, after being traded using a financial computer system 100. In certain embodiments, the financial computer system lists the contract, receives, and/or matches one or more orders to buy or sell the contract prior to settlement by the clearing computer system. The contract may take the form, for example, of a futures contract, an option contract, an OTC swap contract, or another financial instrument. The contract may culminate in cash settlement. While the contract remains a derivative transaction, and prior to the delivery, it may be subject to a central counterparty model.

In some embodiments, the reference rate generation unit 300 generates a plurality of reference rates before receiving a request for a benchmark rate. The exchange computing system implementing the reference rate generation unit may provide an number of transaction based reference rates, such as 5 reference rates. The reference rates are guaranteed to be based on previously executed transactions. The exchange computing system may publish the 5 rates every business day at a specified time e.g., 9:00 EST. The rates may be intended to correlate to 5 different industries/sectors. Parties interested in a reference rate for a particular industry would then use the corresponding reference rate. Each of the reference rates may be termed a segment reference rate. The exchange computing system could publish as many segment reference rates as deemed necessary or desirable by the exchange computing system.

Electric Battery Recharging Unit Controlled by a Reference Rate

In some aspects, the disclosure also relates to a physical container (e.g., a battery) may be filled up (charged) or emptied (discharged) with energy commensurate with a reference rate, which may be a segment reference rate, calculated by a reference rate generation unit. The disclosure provides computing systems and methods for determining reference rates for interest rate based transactions related to particular products, e.g., energy products, where the reference rate is related to, or more accurately represents, the transaction in which the reference rate is implemented.

Figure 5:
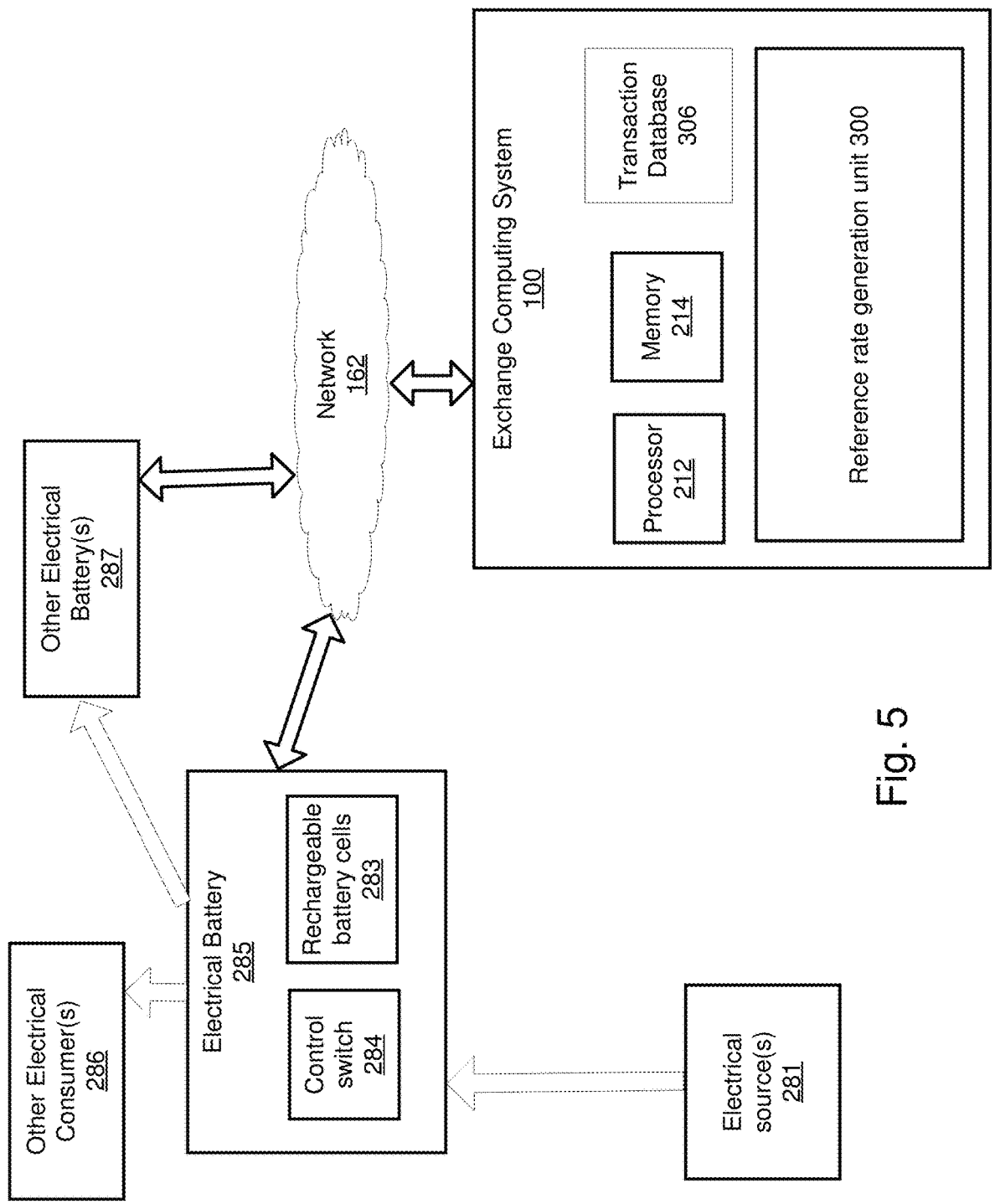
FIG. 5 shows a block diagram representation of an illustrative electrical battery system in communication with an exchange computing system for generating segment reference rates, according to some embodiments.

FIG. 5 illustrates one example of an electrical battery system in accordance with various aspects of the disclosure. The electrical battery system comprises an electrical battery unit 285 and one or more exchange computing systems 100 communicating over a network 162. The electrical battery unit 285 may comprise one or more rechargeable battery cells 283 and a charging input (depicted at the point of the incoming shaded arrow) from one or more electrical sources 281. Examples of electrical sources 281 include an array of solar panels, a windfarm, a nuclear power plant, a water dam, and/or other sources of power generation (including other forms of energy, such as oil, natural gas, and others). The electrical battery unit 285 further comprises a discharging output (depicted at the point of the outgoing shaded arrows) to at least one electrical consumer 286. The electrical consumer, in some instances, may be another electrical battery system 287, a residential house, a commercial factory, an electrical vehicle, and/or any other system or apparatus that consumes energy of any type.

In addition, the electrical battery unit 285 may be communicatively coupled over a network 162 with an exchange computing device 100. The exchange computing device comprises a processor and a non-transitory memory device storing instructions that, when executed by the processor, cause the exchange computing system to use a reference rate generation unit 300 to generate a request specific reference rate, as described in great detail herein.

If the segment reference rate for a particular segment for which the exchange computing system 100 publishes reference rates changes, then the exchange computing system 100 may send, over the network 162, an instruction to the control switch 284 to activate the charging input on the electrical battery 285. When the charging input is activated, the electrical source 281 sends energy to charge the rechargeable battery cells 283. The cells 283 are charged until the level of charge (e.g., the value of the energy stored in the cells 283) is commensurate with the change in the segment reference rate calculated by the exchange computing device 100. Likewise, if the segment reference rate for the particular segment for which the exchange computing system 100 publishes reference rates has not increased, then the computing device 210 sends, over the network 162, an instruction to the control switch 284 to activate the discharging input on the electrical battery 285. When the discharging input is activated, the rechargeable battery cells 283 send energy to other electrical batteries 287 or to electrical consumers 286 commensurate with the change in the segment reference rate.

The control switch 284 may be located in the electrical battery unit 285, or it may be communicatively coupled to the electrical battery unit 285. The switch 284 is configured to control the charging and discharging of the cells 283.

In some embodiments, the energy level of the battery may be based on the reference rate. The reference rate may be calibrated to be represented by the energy level of the battery, e.g., through a multiplication factor. For example, the energy level of the battery may have a range from 0 to 100, which may be displayed through a user interface associated with the battery. The reference rate may be represented by the energy level of the battery through a weighting or multiplication factor. Or, each incremental change in the battery level may represent a corresponding incremental change in the reference rate. For example, for a certain segment, a battery level of 50 may correspond to a reference rate of 1.8%. Each 0.1% increase in the reference rate may correspond to an increase in the battery level by 1. The battery level for a segment reference rate may be based on the segment. Thus, for a particular segment, a battery level range from 0 to 100 may cover or be able to represent a range of different reference rates.

Figure 6:
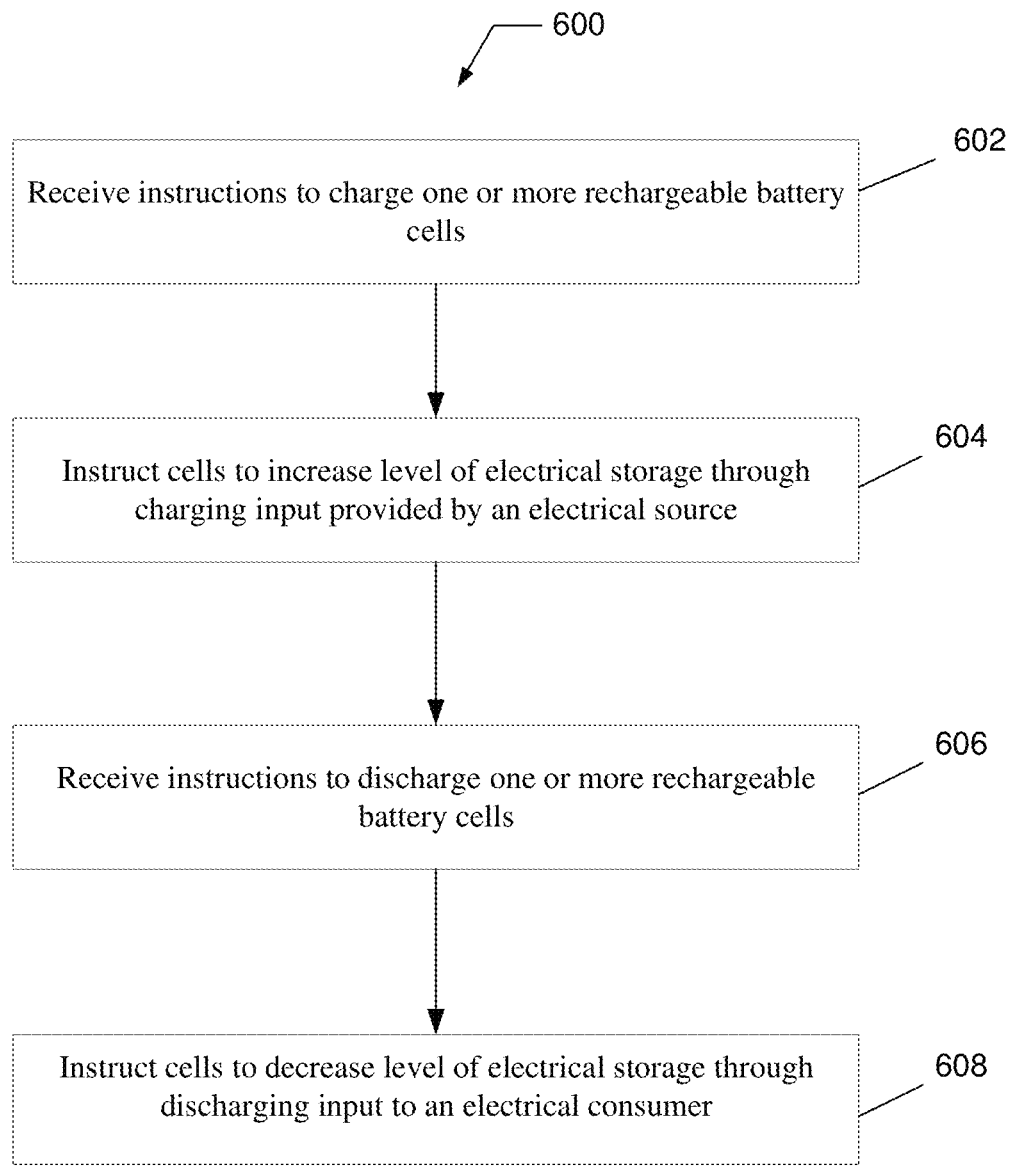
FIG. 6 depicts a high-level flowchart illustrating a method performed by a control switch in an electrical battery unit, according to some embodiments.

FIG. 6 illustrates an example flowchart of an example computer implemented method 600 of charging or discharging rechargeable cells. Embodiments may involve all, more or fewer actions than the illustrated actions. The actions may be performed in the order or sequence shown, or in a different sequence. The actions may be performed simultaneously, or in a parallel or overlapping fashion. The method may be performed by processing logic that may comprise hardware (circuitry, dedicated logic, etc.), software, or a combination of both. In one example, the method is performed by the computer system 100 of FIG. 1, while in some other examples, some or all of the method may be performed by another machine.

The control switch 284 may receive (in step 602), over a network 162, an input from an exchange computing device 100 to charge the one or more rechargeable battery cells 285. In response, the switch 284 may assess the state of the battery unit 285 then instruct (in step 604) the cells 283 to increase its level of electrical storage through charging input provided by an electrical source 281. Meanwhile, if the switch 284 receives (in step 606), over the network 162, an input from the exchange computing device 100 to discharge the cells 283, then the battery unit 285 instructs (in step 608) the one or more rechargeable battery cells to decrease its level of electrical storage through the discharging output to an electrical consumer 286, 287. It is through this charging and discharging that the exchange computing system 100 can confirm that the reference rate has been modified. The value of the energy, e.g., the level of electrical storage in the battery, may fluctuate as the segment reference rate changes, which in turn may be based on the executed transactions for the associated market segment, such as an energy market, thus the electrical battery unit 285 and exchange computing system 100 may be in continuous, repeated, and/or regular communication.

In one aspect, the disclosure relates to a computer implemented method performed by an exchange computing device for generating a request specific reference rate, the method comprising: receiving a plurality of executed transactions, each of the executed transactions associated with a plurality of parameters including a rate, type, quality, duration, and value; receiving, over a network, a request for a reference rate, the request including at least one fixed parameter, the fixed parameter one of a type, quality, duration and value; generating a request specific transaction block that includes a subset of the plurality of executed transactions based on the fixed parameter; calculating a total value for the transaction block by summing up the values associated with the executed transactions in the transaction block; and generating a requested reference rate by weighting the rate of each executed transaction in the transaction block with the value of the executed transaction divided by the total value of the transaction block.

In another aspect, the disclosure relates to a computer system comprising: a processor; and a non-transitory memory device storing instructions that when executed by the processor cause the computer system to: receive a plurality of executed transactions, each of the executed transactions associated with a plurality of parameters including a rate, type, quality, duration, and value; receive, over a network, a request for a reference rate, the request including at least one fixed parameter, the fixed parameter one of a type, quality, duration and value; generate a request specific transaction block that includes a subset of the plurality of executed transactions based on the fixed parameter; calculate a total value for the transaction block by summing up the values associated with the executed transactions in the transaction block; and generate a requested reference rate by weighting the rate of each executed transaction in the transaction block with the value of the executed transaction divided by the total value of the transaction block.

In yet another aspect, the disclosure relates to an exchange computing system configured to generate a request specific reference rate comprising: an executed transaction database storing information for a plurality of executed transactions, each of the executed transactions associated with a plurality of parameters including a rate, type, quality, duration, and value; a reference rate generation unit communicatively coupled to the executed transaction database and comprising: a processor; and a non-transitory memory device storing instructions that, when executed by the processor, cause the reference rate generation unit to: receive, over a network, a request for a reference rate, the request including at least one fixed parameter, the fixed parameter one of a type, quality, duration and value; generate a request specific transaction block that includes a subset of the plurality of executed transactions based on the fixed parameter; calculate a total value for the transaction block by summing up the values associated with the executed transactions in the transaction block; and generate a requested reference rate by weighting the rate of each executed transaction in the transaction block with the value of the executed transaction divided by the total value of the transaction block.

In still another aspect, the disclosure relates to an electrical battery system comprising: an electrical battery unit comprising: one or more rechargeable battery cells; a charging input from at least one electrical source; a discharging output to at least one electrical consumer; a control switch configured to regulate charging and discharging of the one or more rechargeable battery cells by: receiving, over a network, an input from an exchange computing system to charge the one or more rechargeable battery cells; instructing the one or more rechargeable battery cells to increase its level of electrical storage through charging input provided by an electrical source; receiving, over a network, an input from an exchange computing system to discharge the one or more rechargeable battery cells; and instructing the one or more rechargeable battery cells to decrease its level of electrical storage through the discharging output to an electrical consumer; and an exchange computing system comprising a processor and a non-transitory memory device storing instructions that, when executed by the processor, cause the exchange computing system to: calculate a reference rate based on executed transactions related to energy products using a reference rate generation unit; and if the reference rate has increased, then send, over the network, an instruction to the control switch to activate the charging input, else, send, over the network, an instruction to the control switch to activate the discharging input.

In still another aspect, the disclosure relates to an exchange computing system configured to generate, for each of a plurality of segments, a segment reference rate, the system comprising: an executed transaction database storing information for a plurality of executed transactions, each of the executed transactions associated with a plurality of parameters including a rate, type, quality, duration, and value; a reference rate generation unit communicatively coupled to the executed transaction database and comprising: a processor; and a non-transitory memory device storing instructions that, when executed by the processor, cause the reference rate generation unit to, for each segment: generate a transaction block that includes a subset of the plurality of executed transactions based on the segment; calculate a total value for the transaction block by summing up the values associated with the executed transactions in the transaction block; and generate a segment reference rate by weighting the rate of each executed transaction in the transaction block with the value of the executed transaction divided by the total value of the transaction block.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the described embodiments should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

The invention claimed is:

1. A computer implemented method performed by an exchange computing device for automatically generating a request specific reference rate for controlling contents of a physical container, the exchange computing device being operative to transact one or more financial instruments using a hardware processor that matches electronic data transaction request messages to buy or sell the one or more financial instruments, the method comprising:
  receiving, by the hardware processor coupled to a non-transitory memory device storing computer-executable instructions executed by the hardware processor, a plurality of previously executed transactions, each of the previously executed transactions associated with a plurality of parameters including a rate, type, quality, duration, and value;
  receiving, by the hardware processor over a network, a request for a reference rate, the request including at least one fixed parameter, the fixed parameter one of a type, quality, duration and value;
  generating, by the hardware processor, a request specific transaction block that includes a subset of the plurality of previously executed transactions, the subset determined by filtering the plurality of previously executed transactions based on the fixed parameter;
  calculating, by the hardware processor, a total value for the transaction block by summing up the values associated with the executed transactions in the transaction block;
  generating, by the hardware processor, a requested reference rate by weighting the rate of each executed transaction in the transaction block with the value of the executed transaction divided by the total value of the transaction block;
  determining, by the hardware processor, whether the requested reference rate has changed from a prior value;
  transmitting, by the hardware processor, via a network coupled between the hardware processor and a control switch coupled with the physical container, when the requested reference rate has increased, a signal to cause the control switch to fill the physical container; and
  transmitting, by the hardware processor, via the network to the control switch, when the requested reference rate has not increased, a signal to cause the control switch to drain the physical container.

2. The computer implemented method of claim 1, wherein the request is received by the hardware processor from a client computer, the method further comprising transmitting, by the hardware processor, the requested reference rate over the network to the client computer.

3. The computer implemented method of claim 1, wherein the subset of the plurality of previously executed transactions in the transaction block are associated, by the hardware processor, with a type that matches the fixed parameter of the request.

4. The computer implemented method of claim 1, wherein the previously executed transactions are one of mortgage loans, student loans, treasury notes, municipal bonds, or certificate of deposit purchases.

5. The computer implemented method of claim 1, further comprising listing the one or more financial instruments based on the requested reference rate on an exchange computing system.

6. The computer implemented method of claim 1, wherein the physical container comprises a battery.

7. The computer implemented method of claim 6, wherein filling the container comprises charging the battery and wherein draining the container comprises discharging the battery.

8. An exchange computer system for automatically generating a request specific reference rate for controlling contents of a physical container, the exchange computing system being operative to transact one or more financial instruments using a hardware processor that matches electronic data transaction request messages to buy or sell the one or more financial instruments, the exchange computer system comprising:
  the hardware processor; and
  a non-transitory memory device storing computer-executable instructions that when executed by the hardware processor cause the exchange computer system to:
    receive a plurality of previously executed transactions, each of the previously executed transactions associated with a plurality of parameters including a rate, type, quality, duration, and value;

receive, over a network, a request for a reference rate, the request including at least one fixed parameter, the fixed parameter one of a type, quality, duration and value;

generate a request specific transaction block that includes a subset of the plurality of previously executed transactions, the subset determined by filtering the plurality of previously executed transactions based on the fixed parameter;

calculate a total value for the transaction block by summing up the values associated with the previously executed transactions in the transaction block;

generate a requested reference rate by weighting the rate of each executed transaction in the transaction block with the value of the executed transaction divided by the total value of the transaction block;

determine whether the requested reference rate has changed from a prior value;

transmit via a network coupled between the hardware processor and a control switch coupled with the physical container, when the requested reference rate has increased, a signal to cause the control switch to fill the physical container; and transmit via the network to the control switch, when the requested reference rate has not increased, a signal to cause the control switch to drain the physical container.

9. The exchange computer system of claim 8, wherein the subset of the plurality of previously executed transactions in the transaction block are associated with a type that matches the fixed parameter of the request.

10. The exchange computer system of claim 8, wherein the instructions are further configured to, when executed by the hardware processor, cause the exchange computer system to list the one or more financial instruments based on the requested reference rate on an exchange computing system.

11. The exchange computer system of claim 8, wherein the physical container comprises a battery.

12. The exchange computer system of claim 11, wherein filling the container comprises charging the battery and wherein draining the container comprises discharging the battery.

13. An exchange computer system for automatically generating a request specific reference rate for controlling contents of a physical container, the physical container coupled with a control switch, the exchange computing system being operative to transact one or more financial instruments using means for matching electronic data transaction request messages to buy or sell the one or more financial instruments, the exchange computer system comprising:

means for receiving a plurality of previously executed transactions, each of the previously executed transactions associated with a plurality of parameters including a rate, type, quality, duration, and value;

means for receiving a request for a reference rate, the request including at least one fixed parameter, the fixed parameter one of a type, quality, duration and value;

means for generating a request specific transaction block that includes a subset of the plurality of previously executed transactions, the subset determined by filtering the plurality of previously executed transactions based on the fixed parameter;

means for calculating a total value for the transaction block by summing up the values associated with the executed previously transactions in the transaction block;

means for generating a requested reference rate by weighting the rate of each executed transaction in the transaction block with the value of the executed transaction divided by the total value of the transaction block;

means for determining whether the requested reference rate has changed from a prior value;

means for transmitting via a network, when the requested reference rate has increased, a signal to cause the control switch to fill the physical container; and means for transmitting via the network, when the requested reference rate has not increased, a signal to cause the control switch to drain the physical container.

* * * * *